(12) United States Patent
Tochigi et al.

(10) Patent No.: US 8,169,714 B2
(45) Date of Patent: May 1, 2012

(54) TWO-UNIT ZOOM LENS SYSTEM AND IMAGE PICKUP APPARATUS USING THE SAME

(75) Inventors: Akiyoshi Tochigi, Kokubunji (JP); Yasutaka Kashiki, Hino (JP); Eiji Shirota, Hino (JP)

(73) Assignee: Olympus Imaging Corp., Tokyo (JP)

( * ) Notice: Subject to any disclaimer, the term of this patent is extended or adjusted under 35 U.S.C. 154(b) by 253 days.

(21) Appl. No.: 12/798,950

(22) Filed: Apr. 13, 2010

(65) Prior Publication Data
US 2010/0265595 A1    Oct. 21, 2010

(30) Foreign Application Priority Data

Apr. 20, 2009   (JP) .................................. 2009-102109

(51) Int. Cl.
G02B 15/14 (2006.01)
(52) U.S. Cl. ...................................................... 359/691
(58) Field of Classification Search .................. 359/691, 359/793
See application file for complete search history.

(56) References Cited

U.S. PATENT DOCUMENTS

| | | | |
|---|---|---|---|
| 5,715,097 | A | 2/1998 | Shibayama et al. |
| 6,441,967 | B2 | 8/2002 | Furuta |
| 7,310,192 | B2 * | 12/2007 | Nagai et al. .................. 359/691 |
| 2001/0030812 | A1 | 10/2001 | Furuta |

FOREIGN PATENT DOCUMENTS

| | | |
|---|---|---|
| JP | 08-327907 | 12/1996 |
| JP | 2001-330774 | 11/2001 |
| JP | 3587272 | 8/2004 |

* cited by examiner

Primary Examiner — Joseph P Martinez
(74) Attorney, Agent, or Firm — Kenyon & Kenyon LLP

(57) ABSTRACT

A two-unit zoom lens system which forms an image on an image pickup surface, includes in order from an object side to an image side, a first lens unit G1 having a negative refracting power and a second lens unit G2 having a positive refracting power. At the time of zooming from a wide angle end to a telephoto end, a distance between the first lens unit and the second lens unit is narrowed. The first lens unit includes in order from the object side to the image side, a first lens having a negative refracting power, a second lens having a negative refracting power, and a third lens having a positive refracting power, and the two-unit zoom lens system satisfies predetermined conditional expressions.

25 Claims, 16 Drawing Sheets

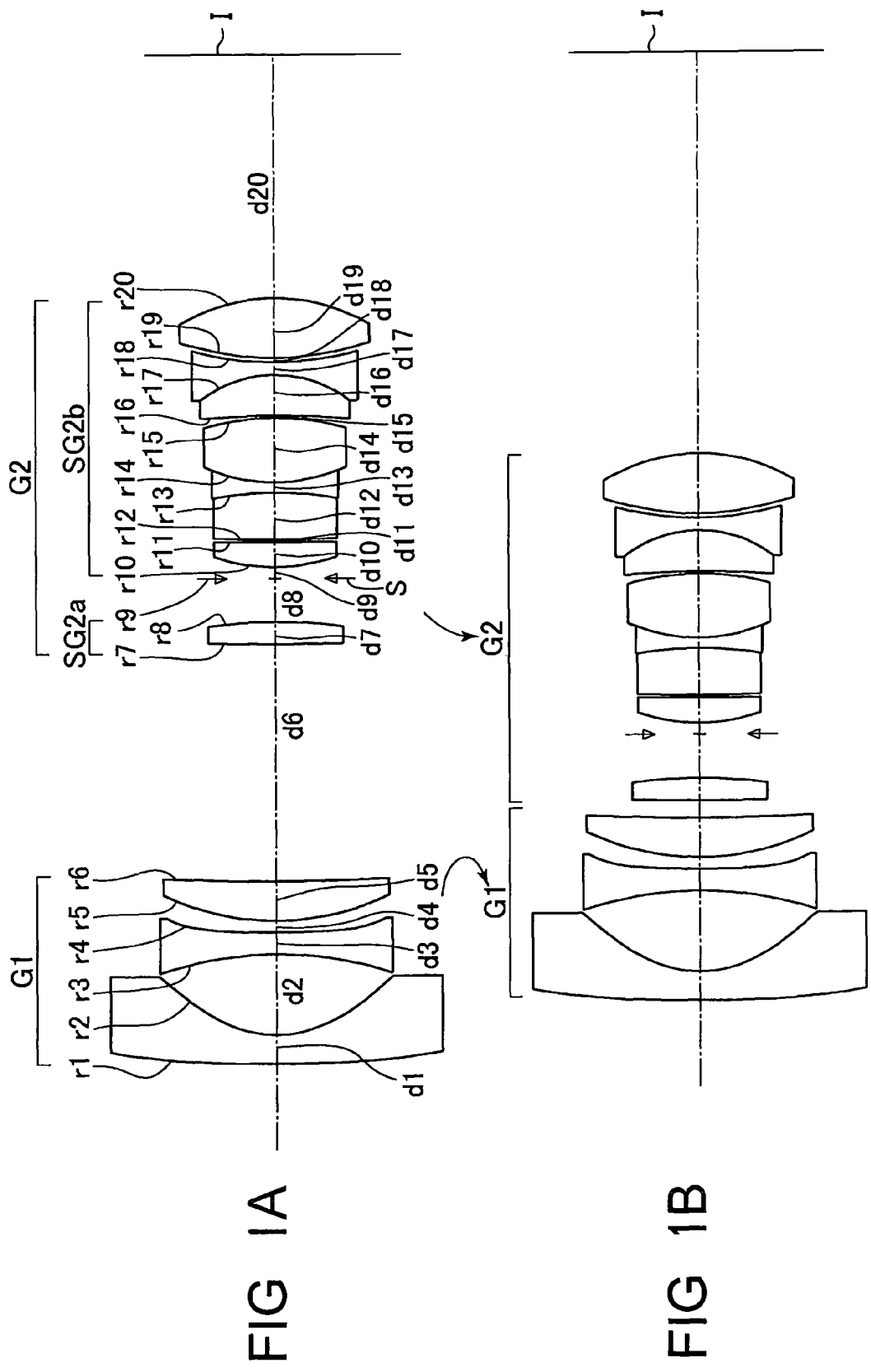

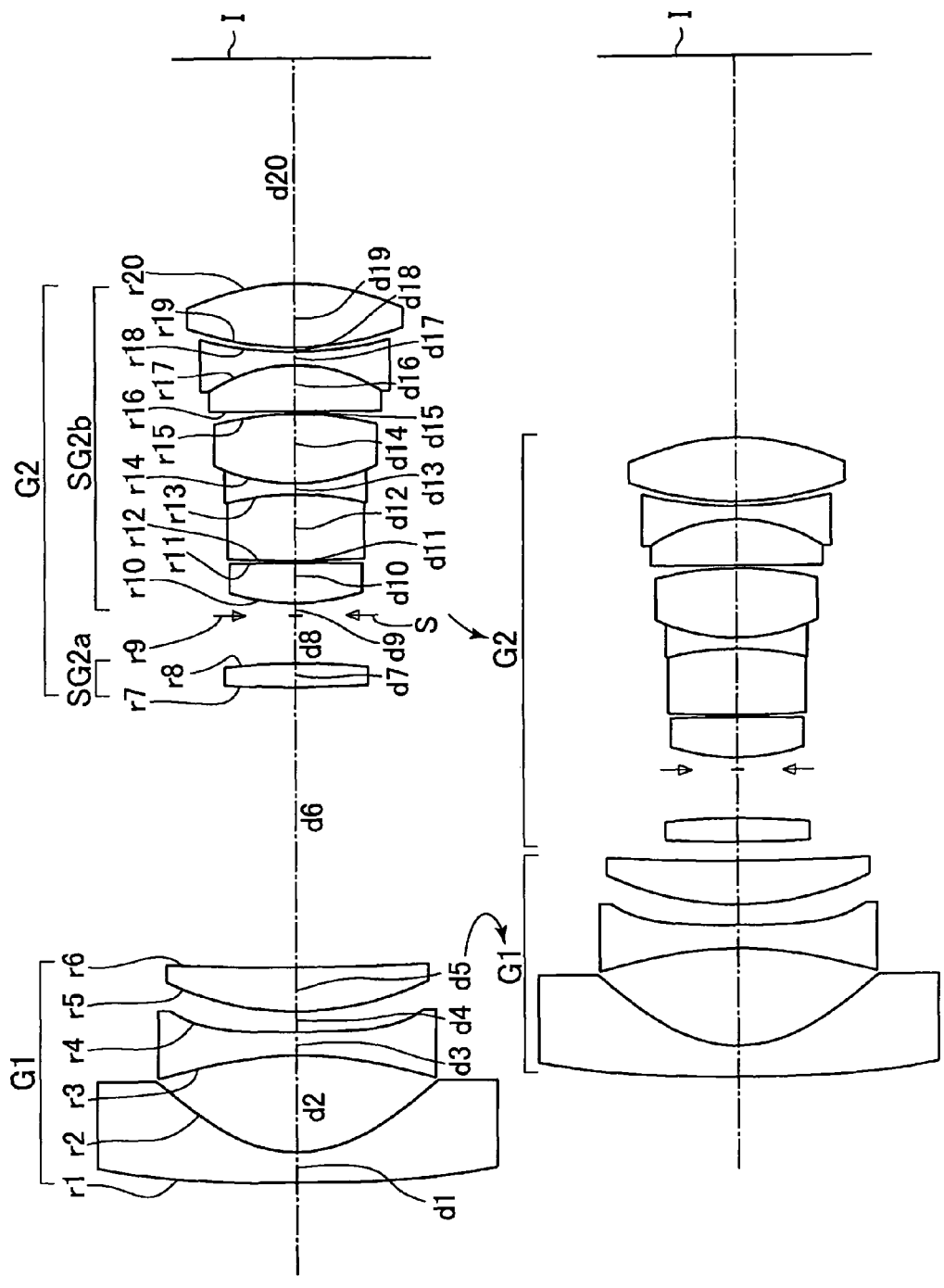

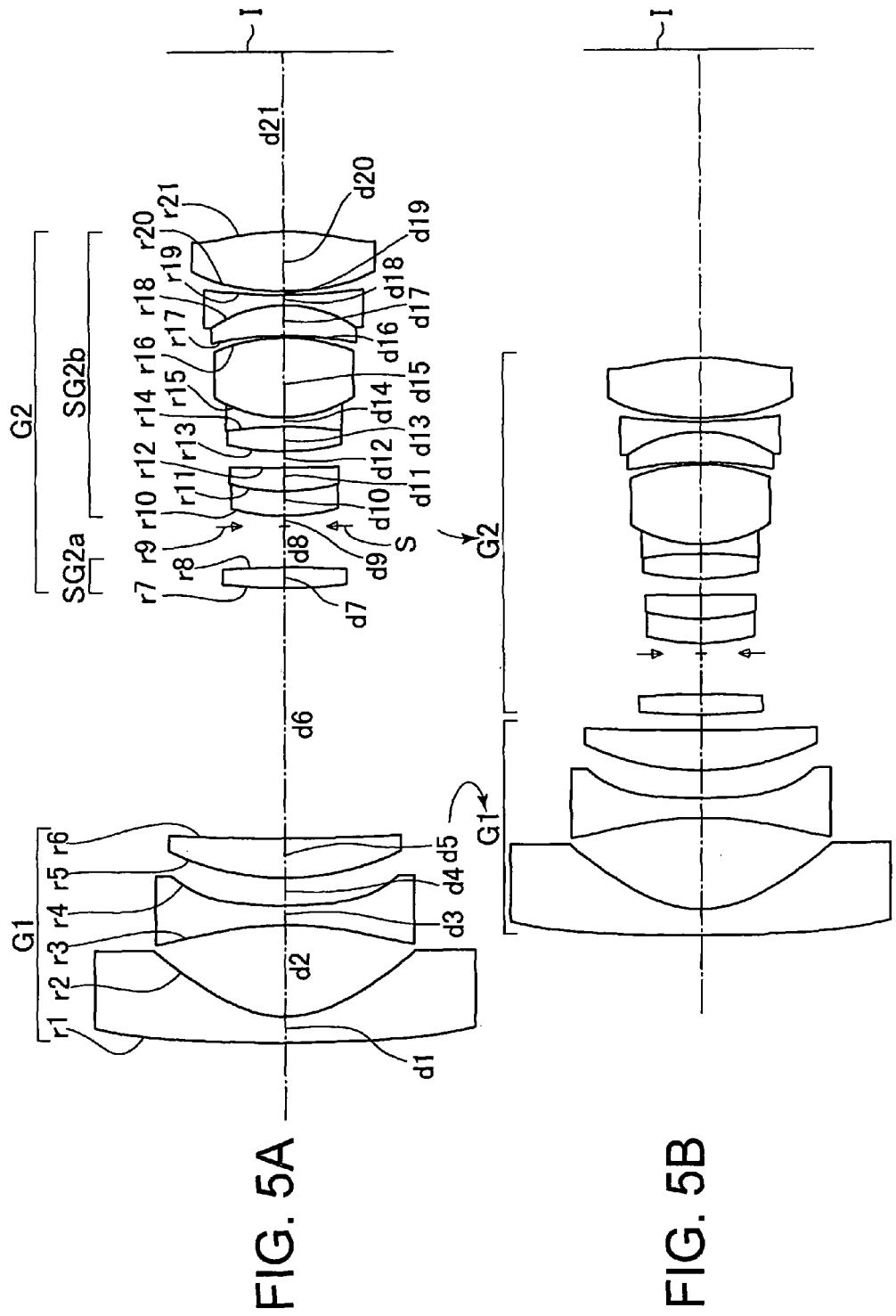

TWO-UNIT ZOOM LENS SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2009-102109 filed on Apr. 20, 2009; the entire contents of which are incorporated herein by reference.

BACKGROUND OF THE INVENTION

1. Field of the Invention

The present invention relates to a two-unit zoom lens system and an image pickup apparatus using the same.

2. Description of the Related Art

A two-unit zoom lens system which includes in order from an object side to an image side, a first lens unit having a negative refracting power and a second lens unit having a positive refracting power has hither to been known (refer to Japanese Patent No. 3587272 and Japanese Patent Application Laid-open Publication No. 2001-330774).

By making such an arrangement, it is possible to make an arrangement with the minimum number of lens units for carrying out zooming, and to make a drive mechanism simple.

An arrangement of such type which is advantageous for securing a back focus is widely used in a wide-angle zoom lens system or an ultra wide-angle zoom lens system having a large angle of field particularly at a wide angle end.

SUMMARY OF THE INVENTION

A two-unit zoom lens system according to a first aspect of the present invention which forms an image on an image pickup surface, comprises in order from an object side to an image side a first lens unit having a negative refracting power, and a second lens unit having a positive refracting power, and at the time of zooming from a wide angle end to a telephoto end, a distance between the first lens unit and a second lens unit is narrowed, and the first lens unit includes in order from the object side to the image side, a first lens element having a negative refracting power, a second lens element having a negative refracting power, and a third lens element having a positive refracting power, and the total number of lens elements in the first lens unit is three, and the two-unit zoom lens system satisfies the following conditional expressions (1) and (2-2)

$$1.28 < |f1|/IH < 1.72 \quad (1)$$

$$2.1 < f2/IH \quad (2-2)$$

where, f1 denotes a focal length of the first lens unit, f2 denotes a focal length of the second lens unit, and IH denotes the maximum image height in an effective image pickup area on the image pickup surface.

A two-unit zoom lens system according to a second aspect of the present invention, which forms an image on an image pickup surface, comprises in order from an object side to an image side a first lens unit having a negative refracting power, and a second lens unit having a positive refracting power, and at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, and a third lens element having a positive refracting power, and the total number of lens elements in the first lens unit is three, and the second lens unit includes an aspherical lens element which is disposed nearest to the image side in the second lens unit, and the two-unit zoom lens system satisfies the following conditional expression (1)

$$1.28 < |f1|/IH < 1.72 \quad (1)$$

where, f1 denotes a focal length of the first lens unit, and

IH denotes the maximum image height in an effective image pickup area of the image pickup surface.

A two-unit zoom lens system according to a third aspect of the present invention, which forms an image on an image pickup surface, comprises in an order from an object side to an image side a first lens unit having a negative refracting power, and a second lens unit having a positive refracting power, and at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, and a third lens element having a positive refracting power, and the total number of lens elements in the first lens unit is three, and the second lens unit comprises in order from the object side to the image side, an object-side sub lens unit and an image-side sub lens unit, and an aperture stop is disposed between the object-side sub lens unit and the image-side sub lens unit, and the aperture stop and the second lens unit move toward the object side at the time of zooming from the wide angle end to the telephoto end, and the two-unit zoom lens system satisfies the following conditional expressions (1) and (3)

$$1.28 < |f1|/IH < 1.72 \quad (1)$$

$$4.0 < f\_g2a/IH \quad (3)$$

where, f1 denotes a focal length of the first lens unit, f1_g2a denotes a focal length of the object-side sub lens unit in the second lens unit, and IH denotes the maximum image height in an effective image pickup area of the image pickup surface.

A two-unit zoom lens system according to a fourth aspect of the present invention, which forms an image on an image pickup surface, comprises in order from an object side to an image side a first lens unit having a negative refracting power, and a second lens unit having a positive refracting power, and at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, and a third lens element having a positive refracting power, and the total number of lens elements in the first lens unit is three, and the two-unit zoom lens system satisfies the following conditional expressions (2-4) and (A)

$$2.1 < f2/IH < 2.45 \quad (2\text{-}4)$$

$$2\omega > 85° \quad (A)$$

where, f2 denotes a focal length of the second lens unit,

IH denotes the maximum image height in an effective image pickup area on the image pickup surface, and ω denotes the maximum photographic half angle of field at the wide angle end.

A two-unit zoom lens system according to a fifth aspect of the present invention, which forms an image on an image pickup surface, comprises in order from an object side to an image side a first lens unit having a negative refracting power, and a second lens unit having a positive refracting power, and at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, and a third lens element having a positive refracting power, and the total number of lens elements in the first lens unit is three, and each of the first lens element, the second lens element, and the third lens element is a single lens element, and the two-unit zoom lens system satisfies the following conditional expressions (2-5) and (A)

$$1.83 < f2/IH < 2.45 \quad (2\text{-}5)$$

$$2\omega > 85° \quad (A)$$

where, f2 denotes a focal length of the second lens unit,

IH denotes the maximum image height in an effective image pickup area on the image pickup surface, and ω denotes the maximum photographic half angle of field at the wide angle end.

A two-unit zoom lens system according to a sixth aspect of the present invention, which forms an image on an image pickup surface, comprises in order from an object side to an image side a first lens unit having a negative refracting power, and a second lens unit having a positive refracting power, and at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, and a third lens element having a positive refracting power, and the total number of lens elements in the first lens unit is three, and the second lens unit comprises in order from the object side to the image side, an object-side sub lens unit and an image-side sub lens unit, and an aperture stop is disposed between the object-side sub lens unit and the image-side sub lens unit, and the aperture stop and the second lens unit move toward to object side at the time of zooming from the wide angle end to the telephoto end, and the two-unit zoom lens system satisfies the following conditional expressions (3-2) and (A)

$$5.0 < fl\_g2a/IH \quad (3\text{-}2)$$

$$2\omega > 85° \quad (A)$$

where, fl_g2a denotes a focal length of the object-side sub lens unit in the second lens unit, IH denotes the maximum image height in an effective image pickup area on the image pickup surface, and ω denotes the maximum photographic half angle of field at the wide angle end.

A two-unit zoom lens system according to a seventh aspect of the present invention, which forms an image on an image pickup surface, comprises in order from an object side to an image side a first lens unit having a negative refracting power, and a second lens unit having a positive refracting power, and at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, and a third lens element having a positive refracting power, and the total number of lens elements in the first lens unit is three, and each of the first lens element, the second lens element, and the third lens element is a single lens element, and the second lens unit comprises in order from the object side to the image side, an object-side sub lens unit and an image-side sub lens unit, and an aperture stop is disposed between the object-side sub lens unit and the image-side sub lens unit, and the aperture stop and the second lens unit move toward the object side at the time of zooming from the wide angle end to the telephoto end, and the two-unit zoom lens system satisfies the following conditional expressions (3) and (A)

$$4.0 < fl\_g2a/IH \quad (3)$$

$$2\omega > 85° \quad (A)$$

where, fl_g2a denotes a focal length of the object-side sub lens unit in the second lens unit, IH denotes the maximum image height in an effective image pickup area on the image pickup surface, and ω denotes the maximum photographic half angle of field at the wide angle end.

An image pickup apparatus of the present invention includes one of the abovementioned two-unit zoom lens systems, and an image pickup element which has an image pickup surface disposed on an image side of the two-unit zoom lens system.

BRIEF DESCRIPTION OF THE DRAWINGS

FIG. 1A and FIG. 1B are lens cross-sectional views at a wide angle end and a telephoto end respectively, at the time of infinite object point focusing of a first embodiment of a two-unit zoom lens system of the present invention;

FIG. 3A and FIG. 3B are diagrams similar to FIG. 1A and FIG. 1B, of a third embodiment of the two-unit zoom lens system of the present invention;

FIG. 5A and FIG. 5B are diagrams similar to FIG. 1A and FIG. 1B, of a fifth embodiment of the two-unit zoom lens system of the present invention;

DETAILED DESCRIPTION OF THE INVENTION

Figures 2A, 2B:
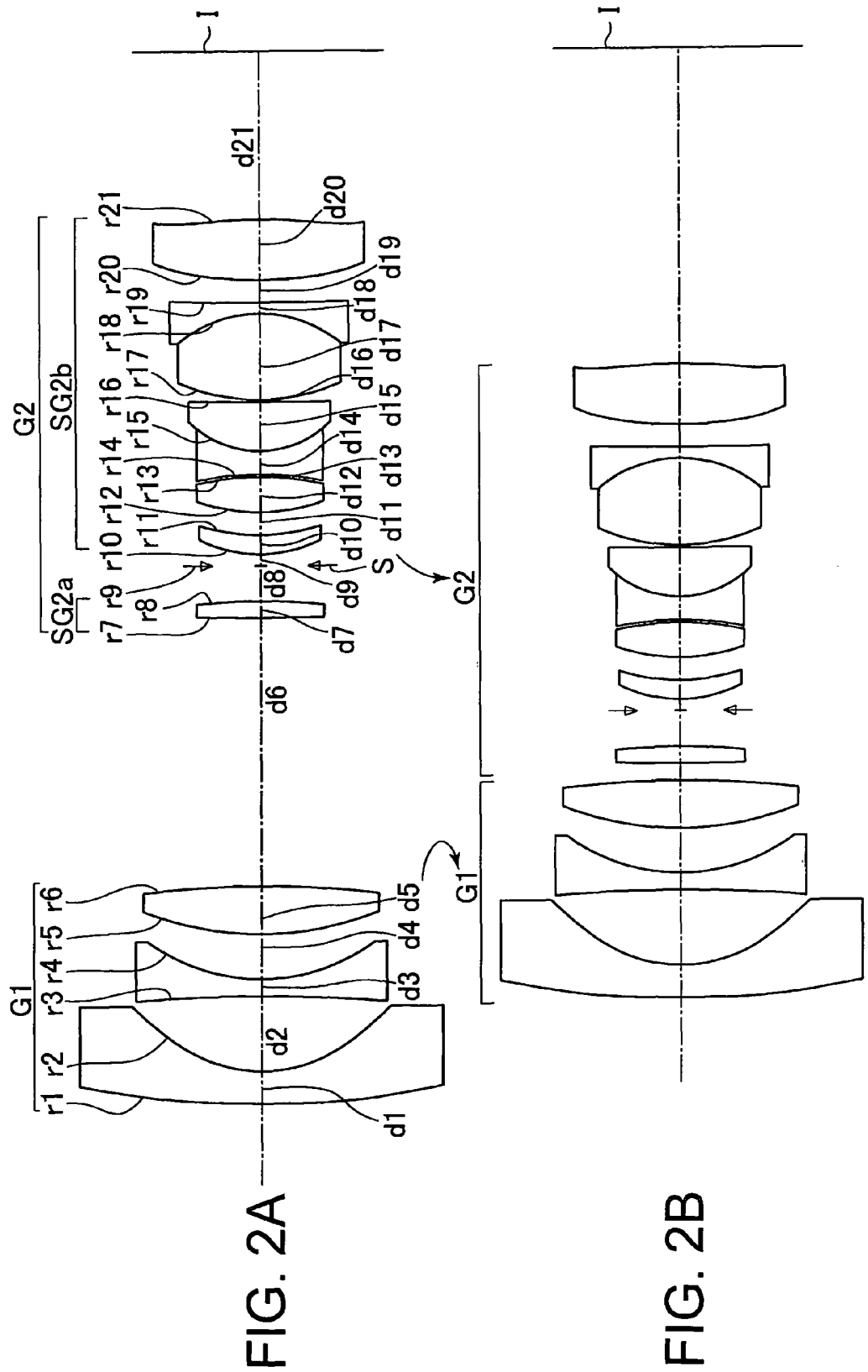
FIG. 2A and FIG. 2B are diagrams similar to FIGS. 1A and 1B, of a second embodiment of the two-unit zoom lens system of the present invention.

Prior to describing embodiments of the present invention, a two-unit zoom lens system of the present invention, and an image pickup apparatus which includes the two-unit zoom lens system will be described below.

The two-unit zoom lens system of the present invention is a two-unit zoom lens system which forms an image on an image pickup surface, and includes in order from an object side to an image side, a first lens unit having a negative refracting power and a second lens unit having a positive refracting power, and at the time of zooming from a wide angle end to a telephoto end, a distance between the first lens unit and the second lens unit is narrowed, and the first lens unit has an arrangement in common which includes in order from the object side to the image side, a first lens having a negative refracting power, a second lens having a negative refracting power, and a third lens having a positive refracting power.

In a wide-angle zoom lens system, for securing a back focus, a two-unit zoom lens system of such negative-positive type is used such that it becomes a zoom lens system of a retro-focus type Moreover, in a case of using in a digital camera in which, an image pickup element such as a CCD (Charge Coupled Device) and a C-MOS (Complementary Metal Oxide Semiconductor) sensor is used, for characteristics such as shading of the image pickup element, it is preferable that the zoom lens system is nearly telecentric toward the image side, and disposing a positive lens unit toward the image side is advantageous for securing a telecentricity.

Furthermore, as an arrangement of the zoom lens system, it becomes a two-unit zoom lens system of the simplest type, and it is advantageous for small sizing and simplifying a mechanical mechanism.

Moreover, by letting the first lens unit to have the abovementioned arrangement, it is advantageous for securing an angle of field and small sizing in a radial direction, and for securing optical performance.

In a wide-angle zoom lens system and an ultra wide-angle zoom lens system, the maximum diameter (a diameter of a filter on an object side of the first lens unit when a filter can be mounted) of the first lens unit has an effect on an outer diameter dimension of a lens frame.

Moreover, the maximum diameter of the first lens unit has a substantial effect of two optical elements namely, an entrance-pupil position (a distance from a surface on the object side of the first lens unit up to an entrance pupil) and the maximum angle of field, whereas, optical specifications such as a so-called a screen size and an F number are secondary elements.

The maximum angle of field being an element related to design specifications, making short the entrance-pupil position is effective for making small a diameter dimension. Therefore, the arrangement of the first lens unit is let to be as described above.

When the number of lenses forming the first lens unit is not less than four, although it is advantageous from a view point of aberration correction, the entrance-pupil position becomes long, thereby leading to a large size.

Moreover, from a view point of correction of an aberration such as astigmatism when an angle of field is secured, it is preferable to carry out a favorable aberration correction in each lens unit in the two-unit zoom lens system. When correction of chromatic aberration is taken into consideration, at least one or more of a negative lens and a positive lens are necessary in the first lens unit. Furthermore, the first lens unit is required to have a strong negative refracting power. When an attempt is made to compensate this negative refracting power by one negative lens, there is an occurrence of astigmatism etc. Therefore, as an arrangement with the minimum number of lenses for favorable aberration correction, it is let to be an arrangement of two negative lenses and one positive lens, and the third lens is let to be a positive lens in order to make short the entrance-pupil position.

In such an arrangement, it is preferable that one of the following arrangements is satisfied.

In the abovementioned two-unit zoom lens system, it is preferable that the following conditional expression (1) is satisfied.

$$1.28 < |f1|/IH < 1.72 \quad (1)$$

where, f1 denotes a focal length of the first lens unit, and

IH denotes the maximum image height in an effective image pickup area on the image pickup surface.

Conditional expression (1) is an expression which specifies a preferable ratio of the focal length of the first lens unit and the maximum image height of the effective image pickup area on the image pickup surface.

In a case such as of correcting an electrical change in an aspect ratio and a distortion occurred in an optical system by processing of an image signal, the effective image pickup area changes, but IH is let to be the maximum value in a possible range. In a two-unit zoom lens system of the negative-positive type, when a lateral magnification of the second lens unit becomes −1 times (uniform magnification), the total length of the optical system (an optical axial distance from a surface on the object side of the zoom lens system up to an image) becomes the shortest. Moreover, a focal length of the overall optical system at this time is equal to an absolute value of the focal length of the first lens unit. When a uniform-magnification position of the second lens unit is considered to be a reference, a change in the total length with respect to an amount of zooming becomes substantial as going away from the uniform magnification. From such point of view, it is preferable that conditional expression (1) is satisfied. By suppressing a refracting power of the first lens unit to be moderate such that a lower limit value is not surpassed, it is advantageous for aberration correction.

By making an arrangement such that an upper limit is not surpassed, it is advantageous for small-sizing of the overall length when angle of field is widened.

In the abovementioned two-unit zoom lens system, it is preferable that the following conditional expression (2) is satisfied.

$$1.83 < f2/IH \quad (2)$$

where, f2 denotes a focal length of the second lens unit.

Conditional expression (2) is an expression which specifies a preferable ratio of the focal length of the second lens unit and the maximum image height of the effective image pickup area on the image pickup surface.

By suppressing the refracting power of the second lens unit such that a lower limit in conditional expression (2) is not surpassed, it is advantageous for aberration correction. Moreover, it is advantageous for securing back focus and securing a distance between the first lens unit and the second lens unit at the telephoto end.

By satisfying conditional expression (2) and conditional expression (1) simultaneously, it is advantageous for securing optical performance and small sizing.

It is preferable to provide an upper limit value of 2.5 in conditional expression (2), and to make an arrangement such that the upper limit value is not surpassed.

$$1.8 < f2/IH < 2.5 \quad (2\text{-}1)$$

At it has been described above, it is preferable to make an arrangement such that a lateral magnification of the second lens unit becomes close to the uniform magnification by one of being zoomed for making the overall length of the optical system short. When the lateral magnification of the second lens unit becomes the uniform magnification, a distance from an object point up to an image point with respect to the second lens unit paraxially becomes four times of the focal length of the second lens unit. Therefore, the overall length of the optical system when the overall length of the optical system becomes the shortest has an effect of the focal length of the second lens unit. From this view point, it is preferable that the two-unit zoom lens system satisfies conditional expression (2-1).

By securing the refracting power of the second lens unit such that an upper limit in conditional expression (2-1) is not surpassed, it is advantageous for making small the overall length of the optical system.

When a lower limit value in conditional expressions (2) and (2-1) is let to be 2.1, it is all the more advantageous for securing the back focus and reduction of an aberration in the second lens unit.

When an upper limit value in conditional expression (2-1 is let to be 2.45, it is all the more advantageous for making small the overall length of the optical system.

For example, it is preferable that two-unit zoom lens system satisfies one of the following conditional expressions.

$$2.1 < f2/IH \quad (2\text{-}2)$$

$$2.1 < f2/IH < 2.5 \quad (2\text{-}3)$$

$$2.1 < f2/IH < 2.45 \quad (2\text{-}4)$$

$$1.83 < f2/IH < 2.45 \quad (2\text{-}5)$$

In the two-unit zoom lens system described above, it is preferable that the second lens unit includes an aspherical lens which is disposed nearest to the image side in the second lens unit.

In a case of the two-unit zoom lens system of the negative-positive type, it is preferable to carry out the aberration correction favorably in each lens unit. By disposing the aspherical lens in the second lens unit, it is advantageous for the aberration correction. Moreover, the diameter is smaller as compared to the first lens unit, and manufacturing of the aspheric surface becomes easy, and it is advantageous from cost point of view. Furthermore, by letting the lens nearest to the image side for which an amount of separation between central light beam and a peripheral light beam is the most substantial in the second lens unit to be an aspherical lens, it is advantageous for correction of both an oblique aberration and a longitudinal aberration.

In the two-unit zoom lens system described above, it is preferable that the second lens unit includes in order from the object side to the image side, an object-side sub lens unit and an image-side sub lens unit, and an aperture stop is disposed between the object-side sub lens unit and the image-side sub lens unit, and the aperture stop and the second lens unit move toward the object side at the time of zooming from the wide angle end to the telephoto end.

By disposing the aperture stop between the object-side sub lens unit and the image-side sub lens unit of the second lens unit, and by moving the aperture stop together with the second lens unit at the time of zooming, it is easy to suppress a fluctuation in the longitudinal aberration (mainly, spherical aberration) at the time of zooming as compared to a two-unit zoom lens system in which the aperture stop is not moved. Moreover, by disposing the aperture stop between two lenses in the second lens unit, it is advantageous for small sizing in a radial direction of the second lens unit.

In the two-unit zoom lens system described above, when the aperture stop is disposed between the two lenses, it is preferable that the following conditional expression (3) is satisfied.

$$4.0 < fl\_g2a/IH \quad (3)$$

where, fl_g2a denotes a focal length of the object-side sub lens unit in the second lens unit.

Conditional expression (3) is an expression which specifies a preferable ratio of the focal length of the object-side sub lens unit and the maximum image height in the effective image pickup area on the image pickup surface.

By suppressing a positive refracting power of the object-side sub lens unit by making an arrangement such that a lower limit in conditional expression (3) is not surpassed, it becomes easy to reduce a degradation of performance due to decentering with the image-side sub lens unit.

It is preferable to provide an upper limit value of 0.7 in conditional expression (3), and to make an arrangement such that the upper limit value in conditional expression (3) is not surpassed.

$$4.0 < fl\_g2a/IH < 7.0 \quad (3\text{-}1)$$

By securing the positive refracting power of the object-side sub lens unit by making an arrangement such that the upper limit value in conditional expression (3-1) is not surpassed, it is advantageous for aberration correction by arrangement of the positive refracting power before and after the aperture stop.

When a lower limit value is let to be 5.0 in conditional expressions (3) and (3-1), it is advantageous for reducing the degradation of performance due to decentering of the object-side sub lens unit.

For example, it is preferable that the two-unit zoom lens system satisfies one of the following conditional expressions.

$$5.0 < fl\_g2a/IH \quad (3\text{-}2)$$

$$5.0 < fl\_g2a/IH < 7.0 \quad (3\text{-}3)$$

In the two-unit zoom lens system described above, it is preferable that the following conditional expression (A) is satisfied.

$$2\omega > 85° \quad (A)$$

where,

ω denotes the maximum photographic half angle of field at the wide angle end.

Conditional expression (A) is an expression which specifies a preferable whole angle of field (two times of a half angle of field ω) at the wide angle end.

The two-unit zoom lens system of the present invention is advantageous for securing an angle of field, by securing the angle of field by making an arrangement such that a lower limit value in conditional expression (A) is not surpassed, an expression in which, a perspective is highlighted (emphasized), and a photography in which, a full advantage of deep depth of field is taken are possible.

In the two-unit zoom lens system described above, it is preferable that each of the abovementioned first lens, the second lens, and the third lens is a single lens.

In the two-unit zoom lens system according to the present invention, an arrangement in the first lens unit is let to be of minimum three lenses for the aberration correction.

Therefore, by letting each of the lens to be a single lens, it is possible to distribute refracting surfaces of the first lens unit into six, and as compared to a case in which, the lenses are cemented, it is possible to secure a degree of freedom of designing, and aberration correction can be carried out easily. Moreover, as compared to the case in which, the respective lenses are cemented, it is possible to make an arrangement in which it is easy to suppress an increase in a radial direction of the first lens.

It is preferable that the two-unit zoom lens system of the present invention satisfies a plurality of the abovementioned arrangements simultaneously.

For instance, it is preferable that the two-unit zoom lens system satisfies conditional expressions (1) and (2-2) simultaneously.

Furthermore, it is preferable that the two-unit zoom lens system satisfies conditional expression (2-3).

Or, it is preferable that the second lens unit includes an aspherical lens which is disposed nearest to the image side of the second lens unit, and the two-unit zoom lens system satisfies conditional expression (1).

Or, it is preferable that, the second lens unit, includes in order from the object side to the image side, an object-side sub lens unit and an image-side sub lens unit, and an aperture stop is disposed between the object-side sub lens unit and the image-side sub lens unit, and the aperture stop and the second lens unit move toward the object side at the time of zooming from the wide angle end to the telephoto end, and the two-unit zoom lens system satisfies conditional expressions (1) and (3).

Furthermore, it is preferable that the two-unit unit zoom lens system satisfies conditional expression (3-1).

Or, it is preferable that the two-unit zoom lens system satisfies conditional expressions (2-4) and (A).

Or, it is preferable that each of the first lens, the second lens, and the third lens is a single lens, and that the two-unit zoom lens system satisfies conditional expressions (2-5) and (A).

Or, it is preferable that the second lens unit, includes in order from the object side to the image side, an object-side sub lens unit and an image-side sub lens unit, and an aperture stop is disposed between the object-side sub lens unit and the image-side sub lens unit, and the aperture stop and the second lens unit move toward the object side at the time of zooming from the wide angle end to the telephoto end, and that the two-unit zoom lens system satisfies conditional expressions (3-2) and (A).

Furthermore, it is preferable that the two-unit zoom lens system satisfies conditional expression (3-3).

Or, it is preferable that the each of the first lens, the second lens, and the third lens is a single lens, and the second lens unit includes in order from the object side to the image side, an object-side sub lens unit and an image-side sub lens unit, and an aperture stop is disposed between the object-side sub lens unit and the image-side sub lens unit, and the aperture stop and the second lens unit move toward the object side at the time of zooming from the wide angle end to the telephoto end, and that the two-unit zoom lens system satisfies conditional expressions (3) and (A).

Furthermore, it is preferable that the two-unit zoom lens system satisfies conditional expression (3-1).

Moreover, for further improvement in optical performance, it is preferable that the two-unit zoom lens system satisfies one or a plurality of the following arrangements.

It is preferable that the first lens in the first lens unit is a negative meniscus lens which is concave on the image side, and has an aspheric surface on the image side and an aspheric surface on the object side, and the surface on the object side of the first lens has a positive refracting power which is higher at a circumferential portion than at a center, and the surface on the image side of the first lens has a negative refracting power which is lower at a circumferential portion than at a center.

For making the entrance-pupil position small, it is paraxially advantageous that a refracting surface nearest to the object side is a concave surface having a negative refracting power. Whereas, when a refracting surface nearest to the object side is let to be a concave surface having a negative refracting power, an excessive distortion is susceptible to occur. Although it is possible to correct the distortion by image processing, when an amount of correction becomes excessively substantial, since an image of a peripheral portion of a screen is drawn radially, degradation of an image quality at a peripheral portion is susceptible to occur.

Moreover, as a prior art, correcting the distortion by disposing a positive lens in front of the negative lens has been known. However, in an optical system of a wide angle of field, when such an arrangement is made, a diameter of this positive lens becomes remarkably substantial, and it is contrary to small sizing.

Consequently, for carrying out the small sizing and reduction of distortion in a balanced manner, it is preferable to let the first lens to be a negative meniscus lens which is concave on the image side.

At this time, when a positive refracting power of a surface on the object side of the negative meniscus lens is made substantial, a negative refracting power of a surface on the image side also becomes relatively substantial. For carrying out aberration correction without increasing the number of lenses in the arrangement, it is preferable to let a surface on the object side and a surface on the image side of the first lens to be an aspheric surface, and regarding the shape thereof, it is preferable to let a shape for which, the surface on the object side has a positive refracting power higher at a circumference that at a center, and the surface on the image side has a negative refracting power smaller at a circumference that at a center.

The negative refracting power is smaller means that with respect to a local negative refracting power of a central portion, the local refracting power at a circumferential portion is close to 0, or positive.

Moreover, as a secondary effect, by making the surface on the image side of the negative meniscus lens an aspheric surface, it becomes easy to make small an air distance between the first lens and the second lens, which leads to slimming of the first lens unit. Accordingly, the entrance-pupil position becomes small, which is advantageous for small sizing.

It is preferable that the first lens in the first lens unit is a negative meniscus lens which is concave on the image side, the second lens is a biconcave negative lens, and the third lens is a positive lens which is convex on the object side.

This is an arrangement which specifies a more preferable lens arrangement of the first lens unit.

By letting the first lens to be a meniscus lens, and an object side to be a convex surface, it is possible to refract gently light rays which are incident on this surface, and this is effective mainly for correcting the distortion. Moreover, by letting the second lens to be a biconcave lens, a negative refracting power is distributed to lens surfaces on both sides, and it becomes easy to suppress an occurrence of various aberrations. Moreover, by letting an object side of the third lens which is facing the concave surface on the image side of the second lens to be a convex surface, it is advantageous for reducing a chromatic aberration.

It is preferable that the second lens unit includes an object-side sub lens unit and an image-side sub lens unit, and at the time of focusing from an infinite distance focusing to a close distance focusing, the object-side sub lens unit in the second lens unit moves independently of the first lens unit and the image-side sub lens unit.

As compared to a case in which, focusing is carried out by moving only a lens in the first lens unit for which an amount of separation of oblique light beam is substantial, by carrying out focusing by moving the object-side sub lens unit, it is possible to suppress a fluctuation in a curvature of field near the wide angle end to be small.

Furthermore, it is preferable that focusing is carried out by moving only the object-side sub lens unit. Accordingly, photography from an infinite distance to a close distance is possible without providing a complicated floating mechanism. Moreover, the object-side sub lens unit being smaller in size than the first lens unit, it is possible to simplify a drive mechanism for focusing, and therefore it is preferable.

It is preferable that the object-side sub lens unit in the second lens unit consists of a single lens having a positive refracting power.

This makes it easy to refract axial light beam which is diverged from the first lens unit, and to make small a size in a radial direction of the second lens unit.

Moreover, in a case of moving the object-side sub lens unit at the time of focusing, it is possible to make the mechanism lighter by letting the sub lens unit to be a single lens having a positive refracting power, which is advantageous for simplifying the drive mechanism and for carrying out a high-speed and stable operation.

It is preferable that the second lens unit includes an aspherical positive lens convex on the image side, which is disposed nearest to the image side in the second lens unit.

In the second lens unit, by letting the lens nearest to the image side where the axial light beam and oblique light beam are separated most, to be an aspheric lens, it is advantageous for correction of oblique aberration.

Furthermore, by letting this lens to be a positive lens which is convex on the image side, it is advantageous for securing telecentricity of the zoom lens system.

It is preferable that the two-unit zoom lens system satisfies the following conditional expression (4).

$$0.7 < f1\_L01/f1 < 1.0 \qquad (4)$$

where, f1_L01 denotes a focal length of the first lens element in the first lens unit.

Conditional expression (4) is an expression which specifies a preferable refracting power of the first lens in the first lens unit.

By making an arrangement such that a lower limit in conditional expression (4) is not surpassed, it becomes easy to suppress an occurrence of the oblique aberration.

By making an arrangement such that an upper limit in conditional expression (4) is not surpassed, it becomes easy to make small the entrance-pupil position, and it is advantageous for small sizing in a radial direction.

It is preferable that the two-unit zoom lens system satisfies the following conditional expression (5).

$$0.7 < f2/\Sigma 2G < 1.0 \qquad (5)$$

where, $\Sigma 2G$ denotes an optical axial thickness of the second lens unit at the time of infinite distance focusing.

Conditional expression (5) is an expression which specifies the preferable axial thickness of the second lens unit.

When the overall length of the optical system is the shortest at the time of zooming from the wide angle end to the telephoto end as described above, the overall length has a substantial effect of the focal length of the second lens unit. Therefore, according to requirement specification, the focal length of the second lens unit is almost determined.

By suppressing the optical axial thickness of the second lens unit by making an arrangement such that a lower limit in conditional expression (5) is not surpassed, it becomes easy to secure a space for movement at the time of zooming.

By securing the optical axial thickness of the second lens unit by making an arrangement such that an upper limit in conditional expression (5) is not surpassed, it is possible to secure sufficiently the number of lenses forming the second lens unit, and it is advantageous for favorable aberration correction.

A lens body having a surface on the object side and a surface on the image side in contact with a space in an optical path of the two-unit zoom lens system, and having no space between the surface on the object side and the surface on the image side is let to be a lens component. At this time, it is preferable that the second lens unit includes in order from the object side to the image side, a first lens component having a positive refracting power, a second lens component having a positive refracting power, a third lens component, a fourth lens component having a negative refracting power, and a fifth lens component having a positive refracting power, and an aperture stop is disposed between the first lens component and the second lens component.

This arrangement is an arrangement in which, the optimum lens arrangement in the second lens unit is specified. By disposing the first lens component having a positive refracting power on the object side of the aperture stop, and by disposing the lens components from the second lens component to the fifth lens component disposed on the image side of the aperture stop, it is easy to carry out correction of various aberrations.

By letting the fourth lens component positioned toward the image side in the second lens unit to have negative refracting power, and by letting the fifth lens component to have positive refracting power, since it is possible to reduce an aberration as well as to let positions of principal points at a rear side of the second lens unit toward the image side, this is advantageous also for securing the back focus at the wide angle end.

Furthermore, it is preferable that the third lens component is a cemented lens component which includes in order from the object side to the image side, a positive lens, a negative lens, and a positive lens.

This is advantageous for correcting the spherical aberration and the chromatic aberration (particularly the longitudinal chromatic aberration) simultaneously.

Furthermore, it is preferable that the fourth lens component is a cemented lens component which includes a plurality of lenses.

By letting the fourth lens component for which the negative refracting power becomes strong in the second lens unit, to be the cemented lens component, it is advantageous for correction of the chromatic aberration, particularly the chromatic aberration of magnification.

Moreover, it is preferable that the fifth lens component is a single lens.

Accordingly, it becomes easy to suppress the optical axial thickness of the second lens unit, and it is advantageous for making the size small in the radial direction.

It is preferable that the first lens in the first lens unit is a meniscus lens which satisfies the following conditional expression (6).

$$-1.15 < (R\_im + R\_ob)/(R\_im - R\_ob) < -1 \quad (6)$$

where, $R\_ob$ is a paraxial radius of curvature of a surface on the object side of the first lens, and $R\_im$ is a paraxial radius of curvature of a surface on the image side of the first lens.

Conditional expression (6) is an expression which specifies a preferable shape factor of the first lens in the first lens unit.

By making an arrangement such that a lower limit in conditional expression (6) is not surpassed, it becomes easy to make the entrance-pupil position small, and it is advantageous for making a diameter of the first lens small.

By making an arrangement such that an upper limit in conditional expression (6) is not surpassed, a surface on the object side of the first lens is let to be convex, and it becomes easy to suppress an excessive occurrence of distortion.

Moreover, even in a case in which a surface of the first lens is let to be an aspheric surface, since it is possible to make a cross-sectional shape which does not have a point of inflection, it is preferable from a view point of manufacturing and from a view point of aberration correction.

It is preferable that at the time of zooming from the wide angle end to the telephoto end, the first lens unit, first moves toward the image side, and thereafter, moves toward the object side, and the second lens unit moves toward the object side.

It is advantageous for both, securing a zooming ratio and shortening the overall length of the optical system in a total zoom range.

It is preferable to use one of the two-unit zoom lens systems described above in an image pickup apparatus which includes a zoom lens system and an image pickup element having an image pickup surface disposed on an image side of the zoom lens system.

Since the two-unit zoom lens system has a favorable telecentricity, an effect of an oblique incidence of light rays on the image pickup surface is suppressed, and a high quality image is achieved.

It is preferable that the two-unit zoom lens system of the present invention satisfies simultaneously a plurality of arrangements described above. Moreover, it is preferable to let the upper limit value and the lower limit value, be as follows in each conditional expression to have more assured effect.

In conditional expression (1), it is more preferable to let the lower limit value be 1.35, and the lower limit value of 1.40 is even more preferable.

Moreover, in conditional expression (1) it is more preferable to let the upper limit value be 1.65, and the upper limit value of 1.60 is even more preferable.

In conditional expressions (2) and (2-1), it is more preferable to let the lower limit value be 2.1, and the lower limit value of 2.2 is even more preferable.

Moreover, in conditional expressions (2) and (2-1), it is more preferable to let the upper limit value be 2.45, and the upper limit value of 2.40 is even more preferable.

In conditional expressions (3) and (3-1), it is more preferable to let the lower limit value be 5.0, and the lower limit value of 5.3 is even more preferable.

Moreover, in conditional expressions (3) and (3-1), it is more preferable to let the upper limit value be 6.5, and the upper limit value of 6.0 is even more preferable.

In conditional expression (4), it is more preferable to let the lower limit value be 0.71.

Moreover, in conditional expression (4), it is more preferable to let the upper limit value be 0.95.

In conditional expression (5), it is more preferable to let the lower limit value be 0.75, and the lower limit value of 0.8 is even more preferable.

Moreover, in conditional expression (5), it is more preferable to let the upper limit value be 0.95.

In conditional expression (6), it is more preferable to let the lower limit value be −1.1.

Moreover, in conditional expression (6), it is more preferable to let the upper limit value be −1.05.

In conditional expression (A), it is more preferable to let the lower limit value be 90°.

Moreover, in conditional expression (A), when an upper limit value is provided, and when an arrangement is made such that the upper limit value does not surpass 120°, and more preferably, does not surpass 115°, it is advantageous for small sizing of a diameter of the first lens.

When the focusing is possible by the two-unit zoom lens system, each conditional expression is let to have values in a state of being focused at the longest distance.

Exemplary embodiments based on the present invention will be described below. Each of the embodiments described below provides two-unit zoom lens system having a wide angle of field at the wide angle end, a small size in a radial direction, and a favorable optical performance.

Moreover, when the two-unit zoom lens system in each embodiment is used in a photographic lens of a compact digital camera or a digital interchangeable lens camera, it is possible to structure a digital camera having a small radial direction at the wide angle end and a superior optical performance.

Each embodiment described below is an example of a zoom lens system of a digital interchangeable lens camera or an integrated-lens type digital camera, and an image pickup apparatus using the same. In embodiments from a first embodiment to a fifth embodiment, the zoom lens system is a wide angle zoom lens system having a high optical performance and superior compactness. In the embodiments from the first embodiment to the fifth embodiment, in the total zoom range, the effective image pickup area is rectangular and fixed. Corresponding values in conditional expressions in each embodiment are values in a state of being focused at the infinite object point. The overall length is a length in which, back focus BK is added to an optical axial distance from a surface of incidence of a lens up to a surface of emergence of the lens. Back focus BF is indicated by an air conversion length.

Next, movement from the wide angle end to the telephoto end in each embodiment will be described below. A first lens unit G1, after moving toward the image side, moves toward the object side. A second lens unit G2 moves only toward the object side. Focusing from an infinite distance to a close distance is carried out by moving the lens component (an object-side sub lens unit SG2a) nearest to the object side in the second lens unit G2, to the image side.

The embodiments from the first embodiment to the fifth embodiment of the two-unit zoom lens system of the present invention will be described below. Lens cross-sectional views at (a) the wide angle end and (b) the telephoto end, at the time of infinite object point focusing of the embodiments from the first embodiment to the fifth embodiment are shown in diagrams from FIG. 1A to FIG. 5B.

Figure 16:
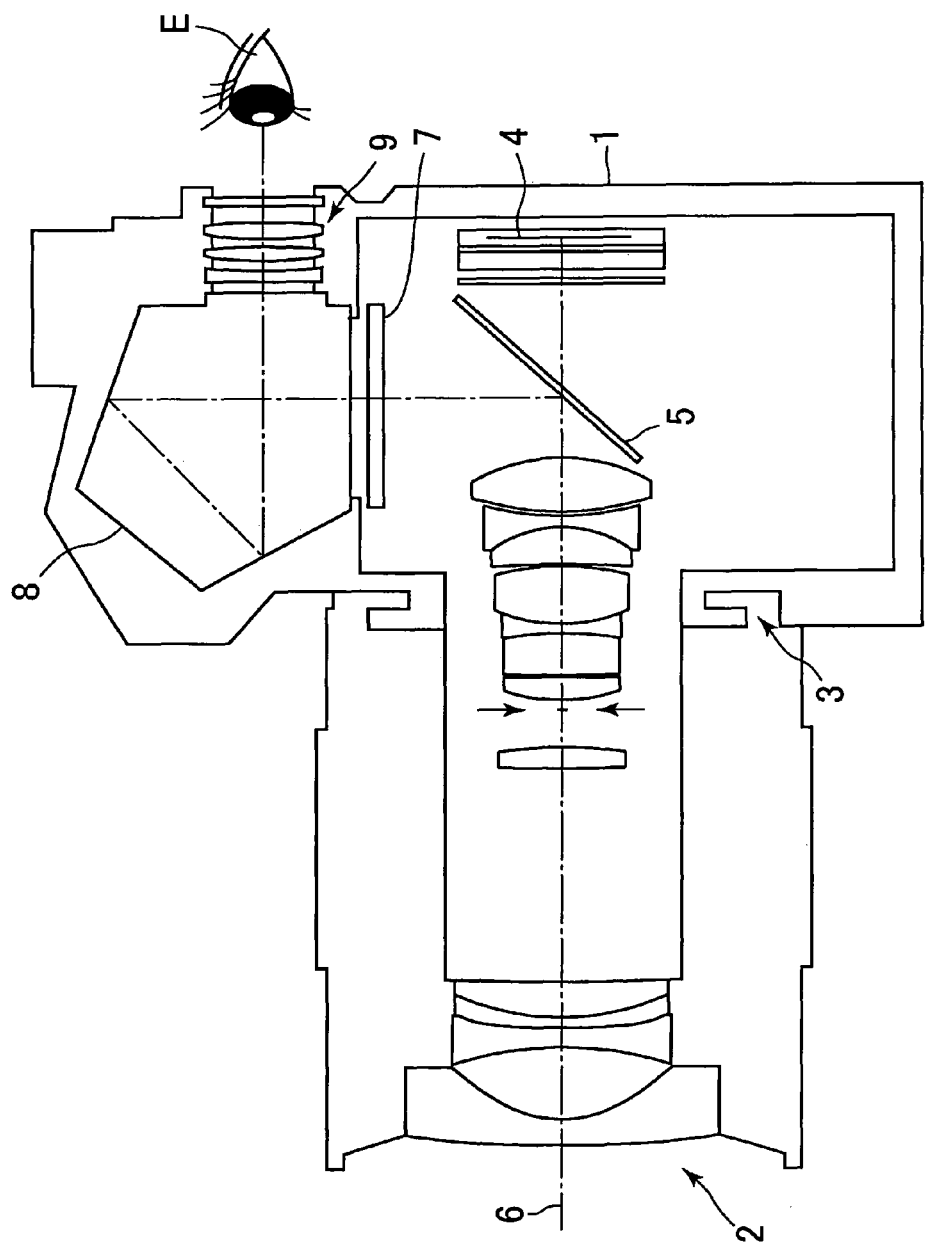
FIG. 16 is a cross-sectional view of a single-lens reflex camera in which, the two-unit zoom lens system of the present invention is used.

In each of the diagrams, the first lens unit is denotes by G1, the second lens unit is denoted by G2, the aperture stop is denoted by S, and the image pickup surface of the CCD (or the CMOS) as the image pickup element is denoted by I. The aperture stop has an opening portion of which, opening size is variable, and F number is variable. (F number in examples of numerical values which will be described later denotes the smallest F number in a variable range.) A cover glass of the CCD is omitted in diagrams from FIG. 1A to FIG. 5B and in numerical data which will be described later, and is indicated in the description of FIG. 16 which will be made later. A low pass filter and an infra-red cutting and absorbing filter may be disposed in the back focus.

A zoom lens system in the first embodiment, as shown in FIG. 1A and FIG. 1B, includes in order from an object side, a first lens unit G1 having a negative refracting power and a second lens unit G2 having a positive refracting power.

An aperture stop S is disposed between a lens component nearest to the object side (object-side sub lens unit SG2a) in the second lens unit G2 and a second lens component from the object side in the second lens unit G2. Lens components from the second lens component on the object side up to a lens component on the image side form an image-side sub lens unit SG2b.

Movement at the time of zooming from the wide angle end to the telephoto end will be described below.

The first lens unit G1 moves toward the image side from the wide angle end up to an intermediate state in zooming, and moves toward the object side from that state up to the telephoto end. At the telephoto end, the first lens unit G1 is positioned toward the image side than a position at the wide angle end.

The second lens unit G2 and the aperture stop S move integrally toward the object side while narrowing a distance from the first lens unit G1, from the wide angle end to the telephoto end.

In order from the object side, the first lens unit G1 includes a negative meniscus lens having a convex surface directed toward the object side and a concave surface directed toward the image side, a biconcave negative lens, and a positive meniscus lens having a convex surface directed toward the object side. The second lens unit G2 includes a biconvex positive lens, a positive meniscus lens having a convex surface directed toward the object side, a cemented lens of a biconvex positive lens, a biconcave negative lens, and a biconvex positive lens, a cemented lens of a positive meniscus lens having a concave surface directed toward the object side and a biconcave negative lens, and a biconvex positive lens. The aperture stop S is disposed in a space between the first lens and the second lens of the second lens unit G2.

An aspheric surface is used for five surfaces namely, both surfaces of the negative meniscus lens and a surface on the image side of the biconcave negative lens in the first lens unit G1, and both surfaces of the biconvex positive lens nearest to the image side in the second lens unit G2.

Focusing from the infinite distance to the close distance is carried out by moving the biconvex positive lens nearest to the object side in the second lens unit G2, toward the image side.

A zoom lens system in the second embodiment, as shown in FIG. 2A and FIG. 2B, includes in order from an object side, a first lens unit G1 having a negative refracting power and a second lens unit G2 having a positive refracting power.

An aperture stop S is disposed between a lens component nearest to the object side (object-side sub lens unit SG2a) in the second lens unit G2 and a second lens component from the object side in the second lens unit G2. Lens components from the second lens component on the object side up to a lens component on the image side form an image-side sub lens unit SG2b.

Movement at the time of zooming from the wide angle end to the telephoto end will be described below.

The first lens unit G1 moves toward the image side from the wide angle end up to an intermediate state in zooming, and moves toward the object side from that state up to the telephoto end. At the telephoto end, the first lens unit G1 is positioned toward the image side of a position at the wide angle end.

The second lens unit G2 and the aperture stop S move integrally toward the object side while narrowing a distance from the first lens unit G1, from the wide angle end to the telephoto end.

In order from the object side, the first lens unit G1 includes a negative meniscus lens having a convex surface directed toward the object side and a concave surface directed toward the image side, a biconcave negative lens, and a biconvex positive lens. The second lens unit G2 includes a biconvex positive lens, a positive meniscus lens having a convex surface directed toward the object side, a biconvex positive lens, a cemented lens of a biconcave negative lens and a positive meniscus lens having a convex surface directed toward the object side, a cemented lens of a biconvex positive lens and a biconcave negative lens, and a biconvex positive lens. The aperture stop S is disposed in a space between the first lens and the second lens of the second lens unit G2.

An aspheric surface is used for four surfaces namely, both surfaces of the negative meniscus lens in the first lens unit G1, and both surfaces of the biconvex positive lens nearest to the image side in the second lens unit G2.

Focusing from the infinite distance to the close distance is carried out by moving the biconvex positive lens nearest to the object side in the second lens unit G2, toward the image side.

A zoom lens system in the third embodiment, as shown in FIG. 3A and FIG. 3B, includes in order from an object side, a first lens unit G1 having a negative refracting power and a second lens unit G2 having a positive refracting power.

An aperture stop S is disposed between a lens component nearest to the object side (object-side sub lens unit SG2a) in the second lens unit G2 and a second lens component from the object side in the second lens unit G2. Lens components from the second lens component on the object side up to a lens component on the image side form an image-side sub lens unit SG2b.

Movement at the time of zooming from the wide angle end to the telephoto end will be described below.

The first lens unit G1 moves toward the image side from the wide angle end up to an intermediate state in zooming, and moves toward the object side from that state up to the telephoto end. At the telephoto end, the first lens unit G1 is positioned toward the image side than a position at the wide angle end.

The second lens unit G2 and the aperture stop S move integrally toward the object side while narrowing a distance from the first lens unit G1, from the wide angle end to the telephoto end.

In order from the object side, the first lens unit G1 includes a negative meniscus lens having a convex surface directed toward the object side and a concave surface directed toward the image side, a biconcave negative lens, and a positive meniscus lens having a convex surface directed toward the object side. The second lens unit G2 includes a biconvex positive lens, a biconvex positive lens, a cemented lens of a biconvex positive lens, a biconcave negative lens, and a biconvex positive lens, a cemented lens of a biconvex positive lens and a biconcave negative lens, and a biconvex positive lens. The aperture stop S is disposed in a space between the first lens and the second lens of the second lens unit G2.

An aspheric surface is used for six surfaces namely, both surfaces of the negative meniscus lens and both surfaces of the biconcave negative lens in the first lens unit G1, and both surface of the biconvex positive lens nearest to the image side in the second lens unit G2.

Focusing from the infinite distance to the close distance is carried out by moving the biconvex positive lens nearest to the object side in the second lens unit G2, toward the image side.

Figures 4A, 4B:
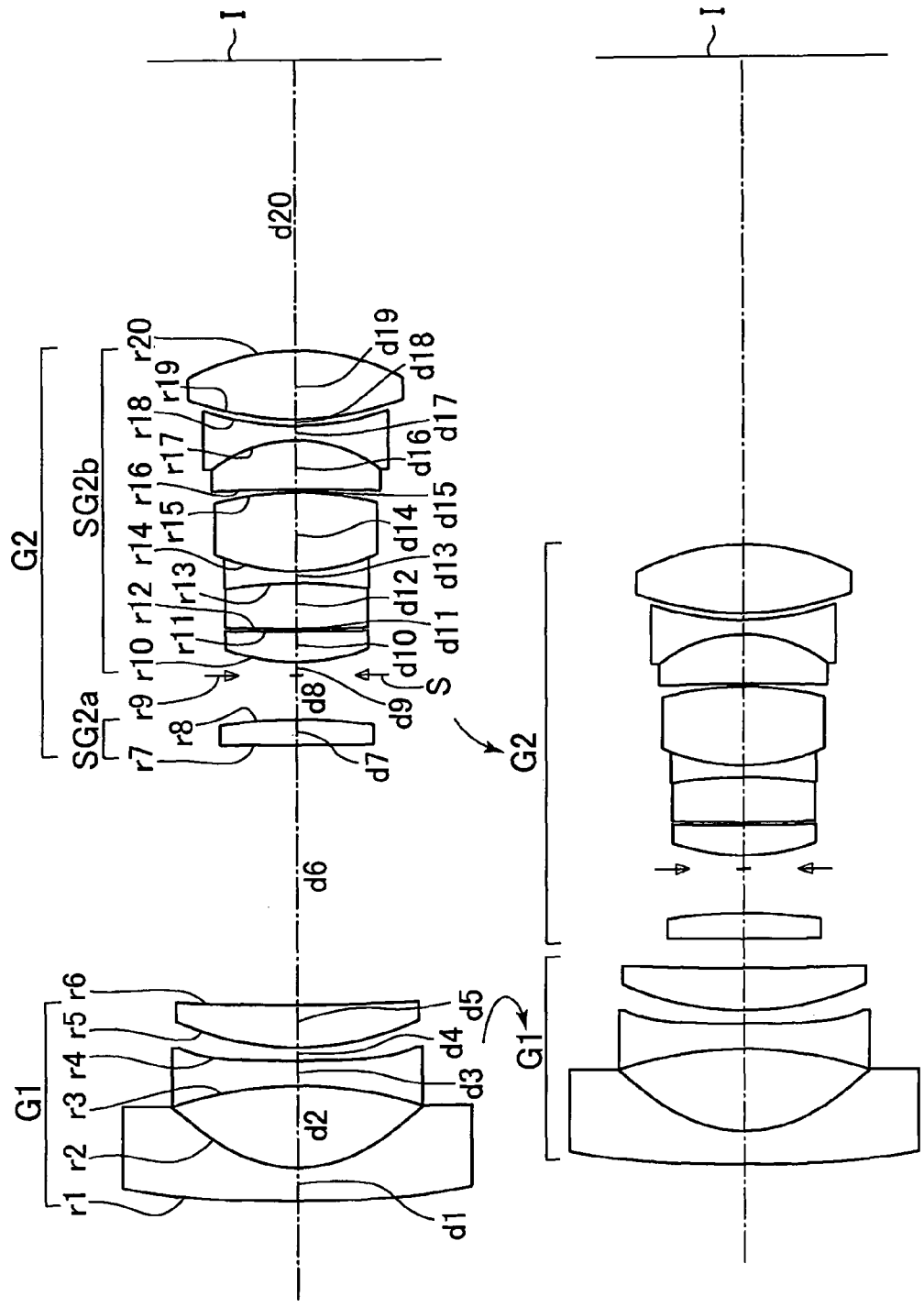
FIG. 4A and FIG. 4B are diagrams similar to FIG. 1A and FIG. 1B, of a fourth embodiment of the two-unit zoom lens system of the present invention.
Figure 6A:
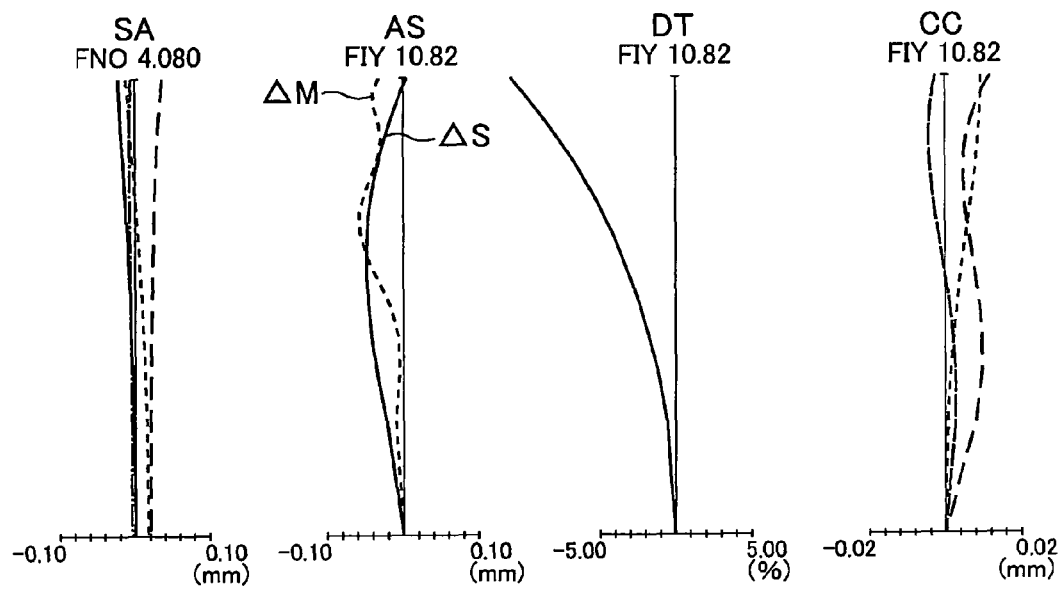
FIG. 6A and FIG. 6B are aberration diagrams at the time of infinite distance focusing, of the first embodiment.
Figure 6B:
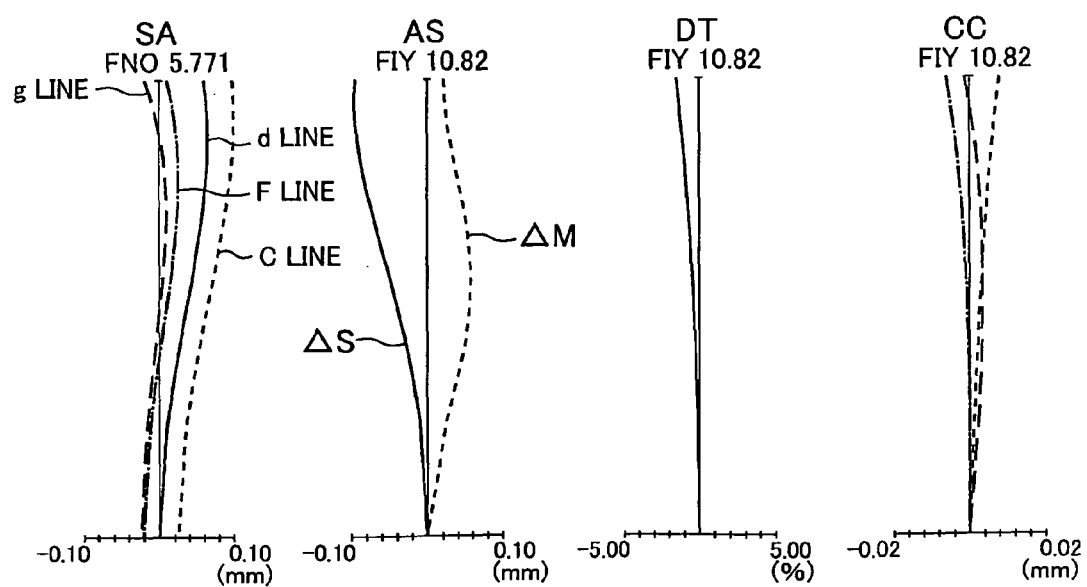
Figure 7A:
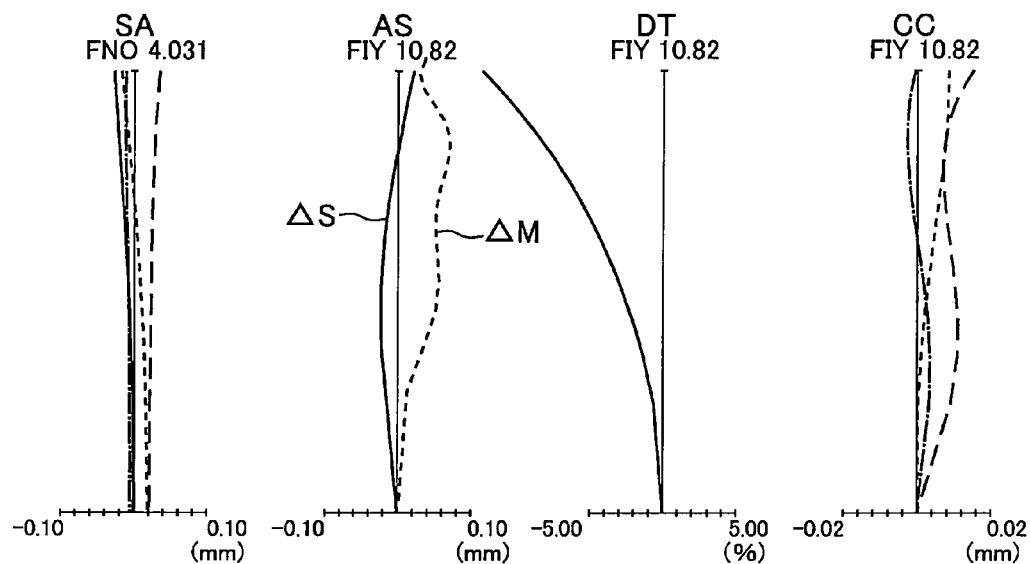
FIG. 7A and FIG. 7B are aberration diagrams at the time of close distance focusing of the first embodiment.
Figure 7B:
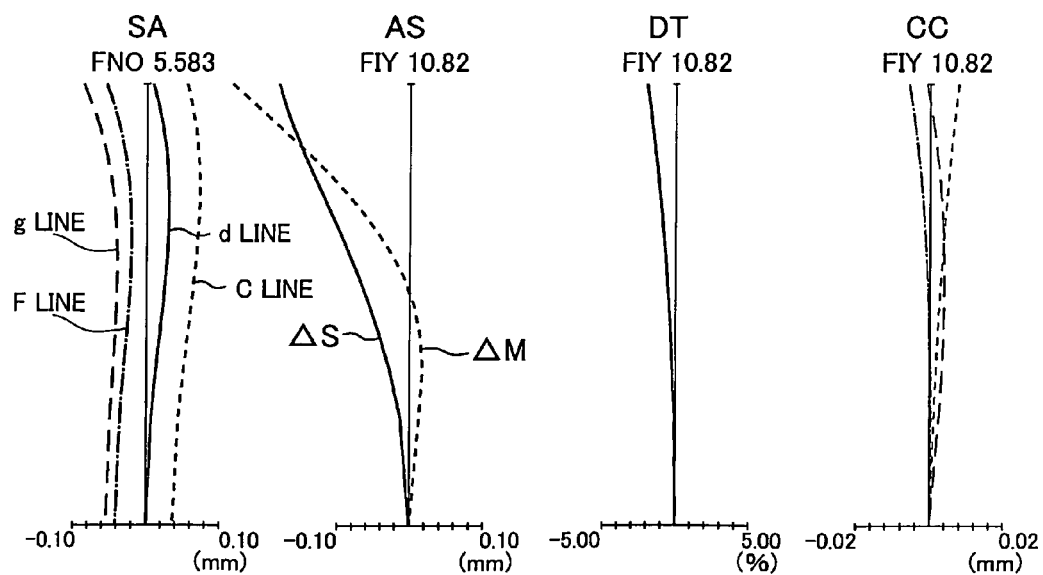
Figure 8A:
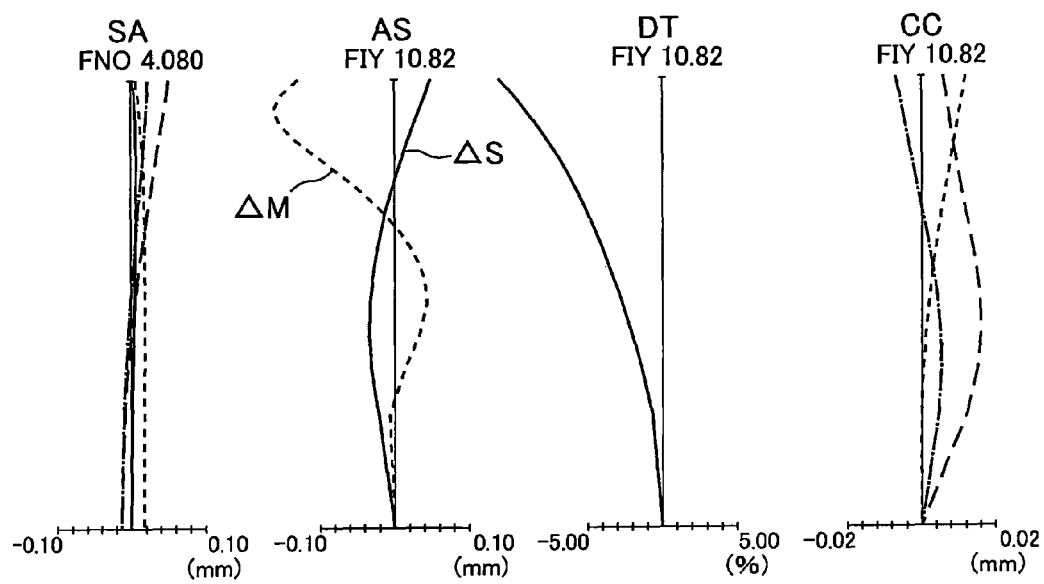
FIG. 8A and FIG. 8B are aberration diagrams at the time of infinite distance focusing, of the second embodiment.
Figure 8B:
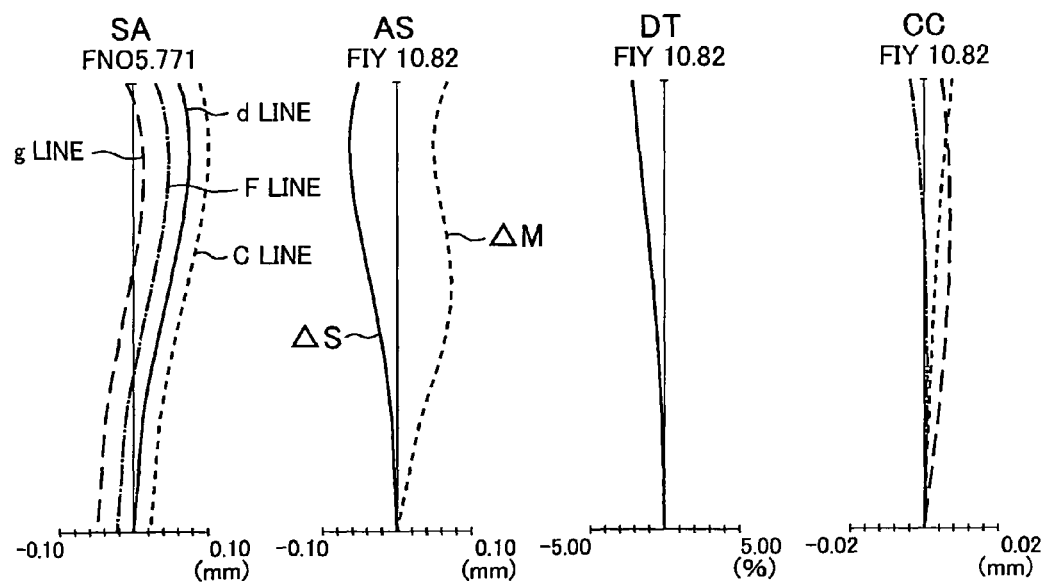
Figure 9A:
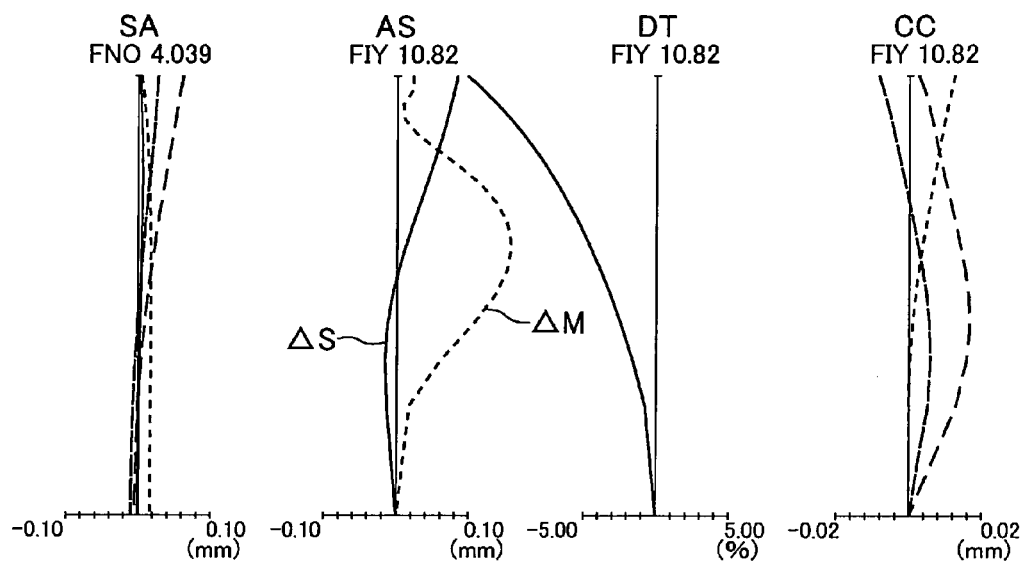
FIG. 9A and FIG. 9B are aberration diagrams at the time of close distance focusing of the second embodiment.
Figure 9B:
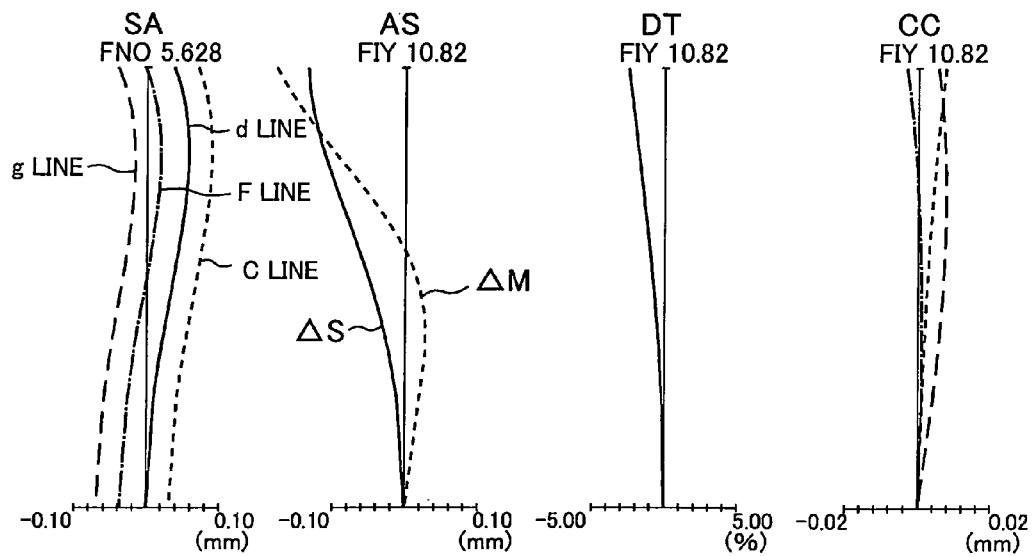
Figure 10A:
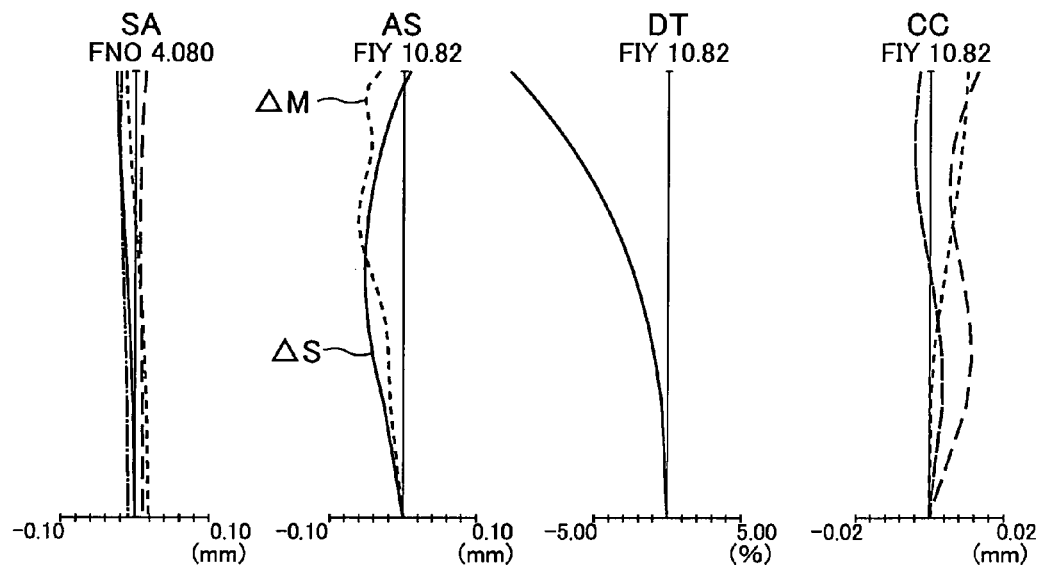
FIG. 10A and FIG. 10B are aberration diagrams at the time of infinite distance focusing, of the third embodiment.
Figure 10B:
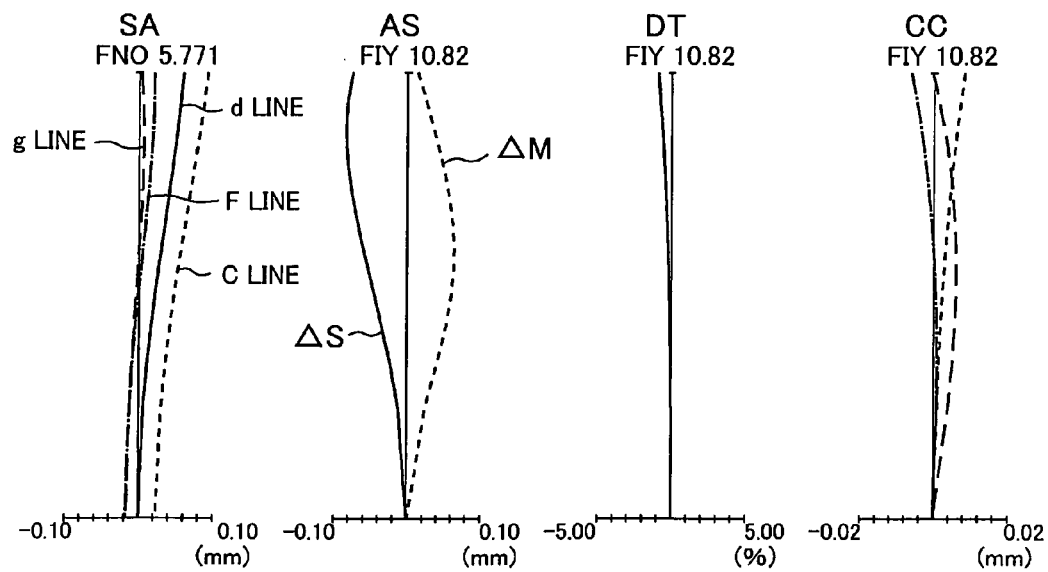
Figure 11A:
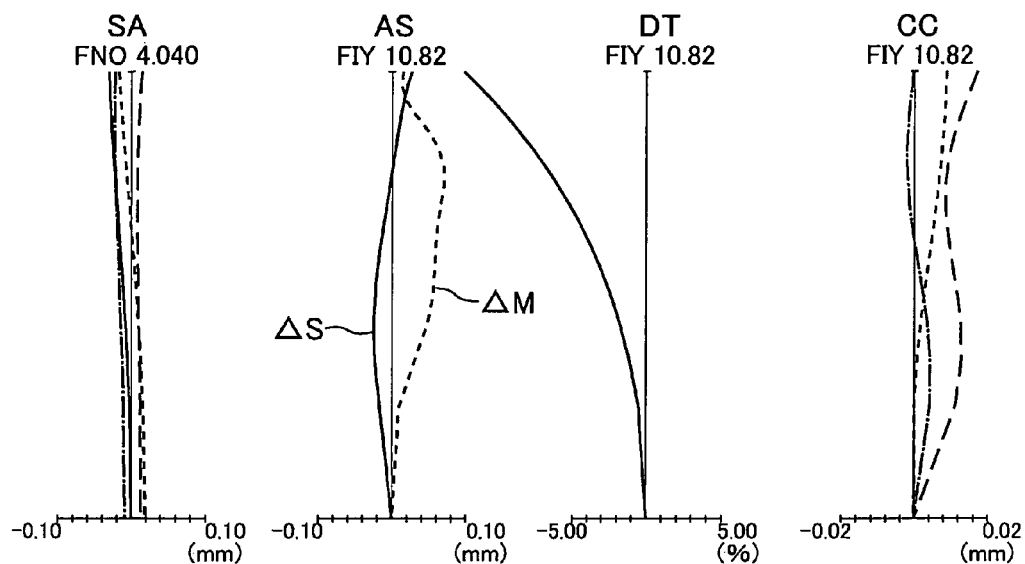
FIG. 11A and FIG. 11B are aberration diagrams at the time of close distance focusing, of the third embodiment.
Figure 11B:
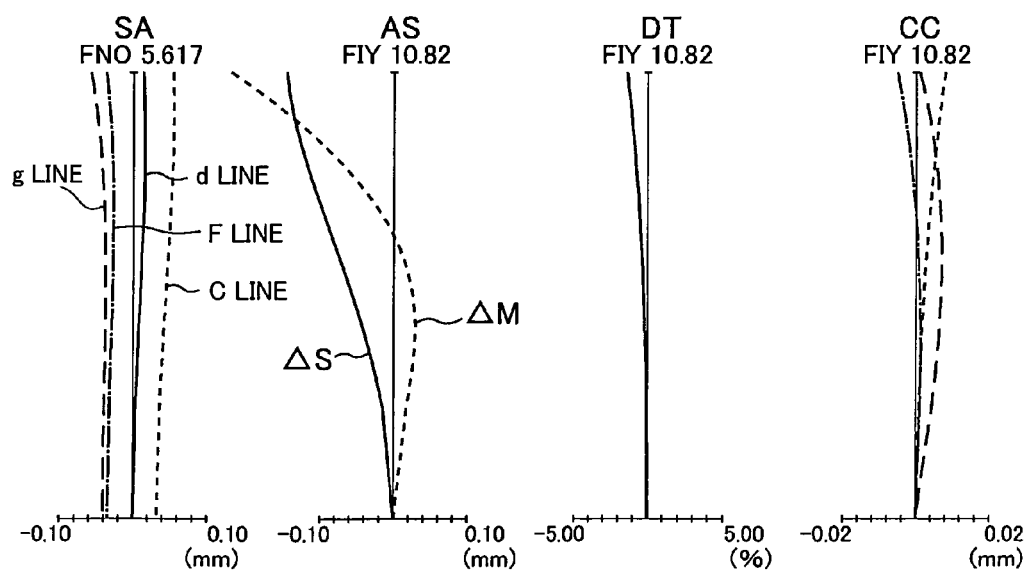
Figure 12A:
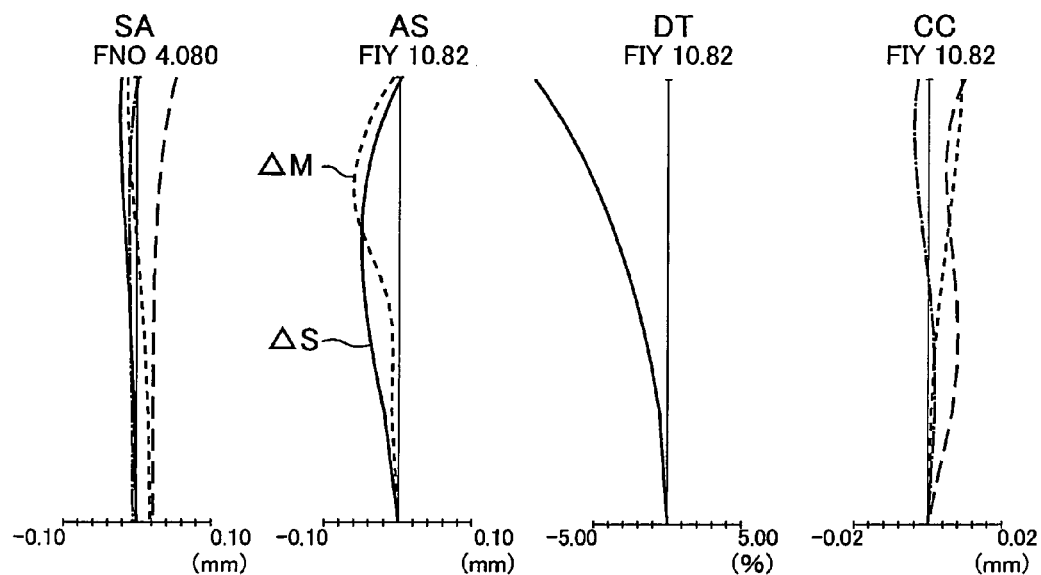
FIG. 12A and FIG. 12B are aberration diagrams at the time of infinite distance focusing, of the fourth embodiment.
Figure 12B:
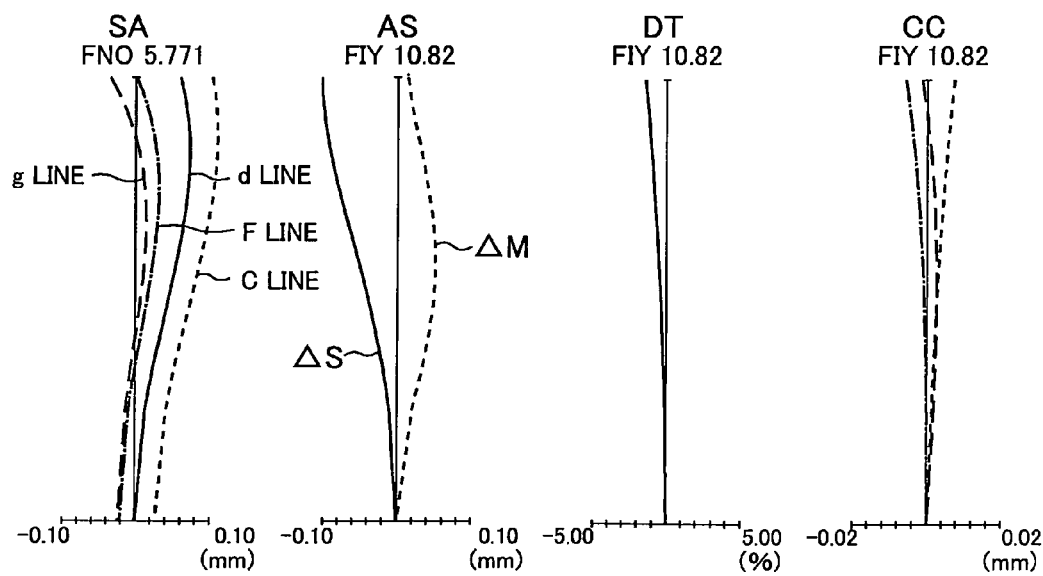
Figure 13A:
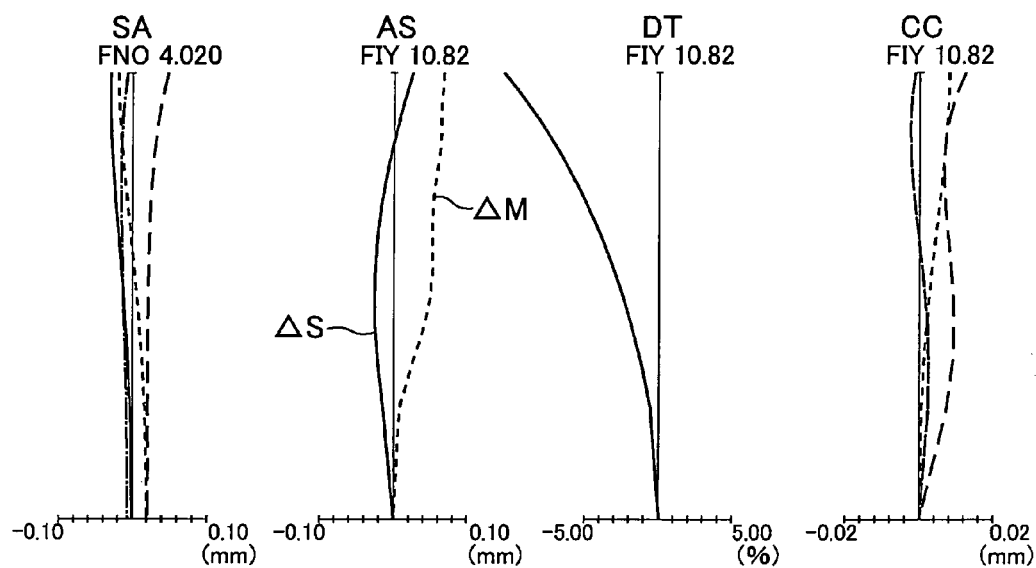
FIG. 13A and FIG. 13B are aberration diagrams at the time of close distance focusing, of the fourth embodiment.
Figure 13B:
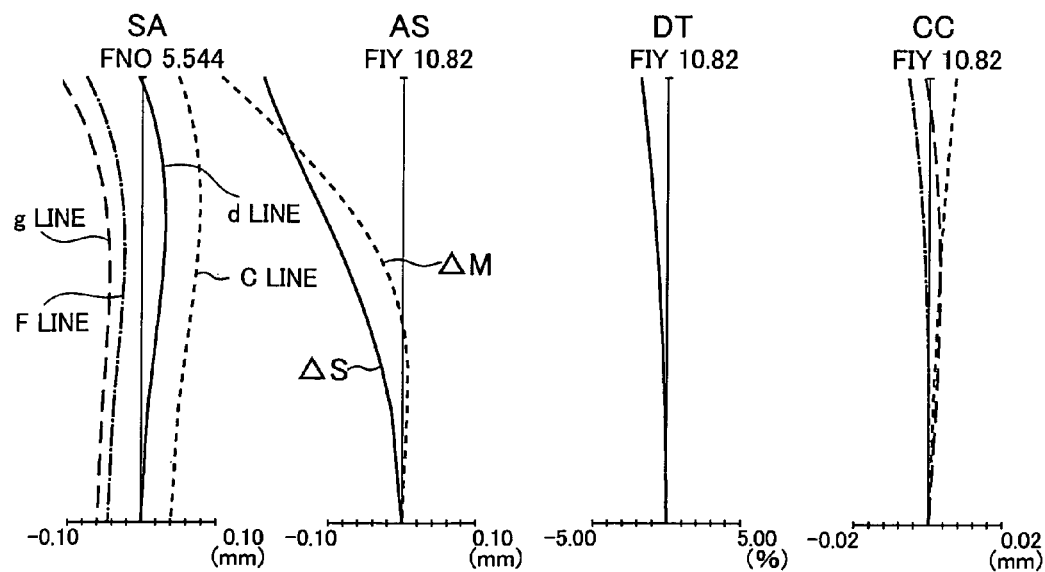
Figure 14A:
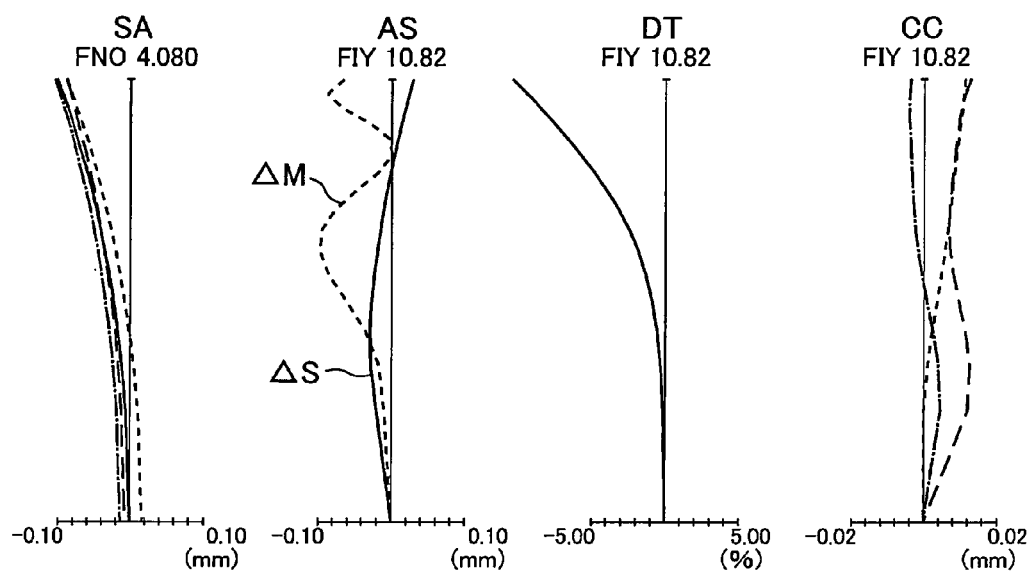
FIG. 14A and FIG. 14B are aberration diagrams at the time of infinite distance focusing, of the fifth embodiment.
Figure 14B:
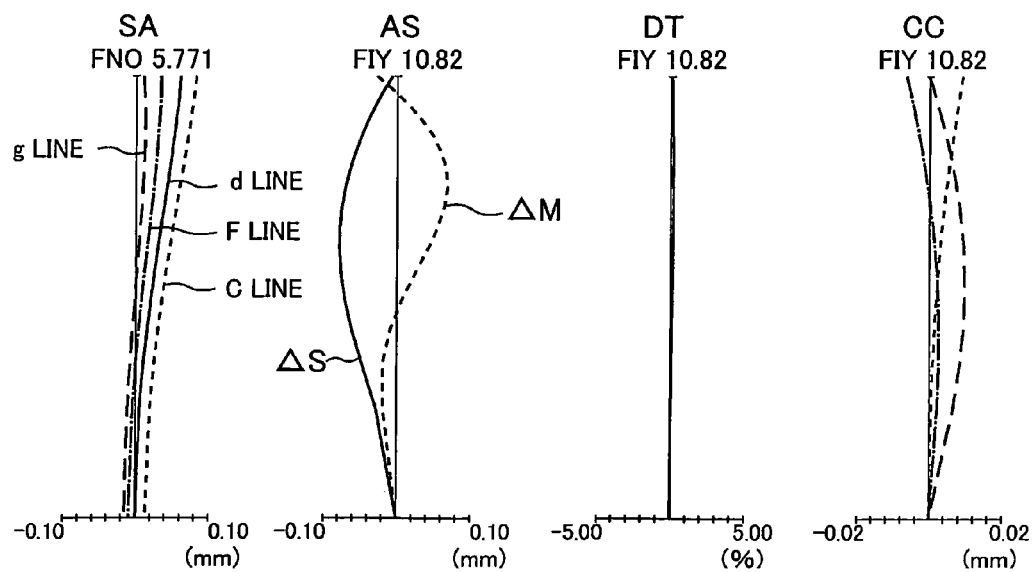
Figure 15A:
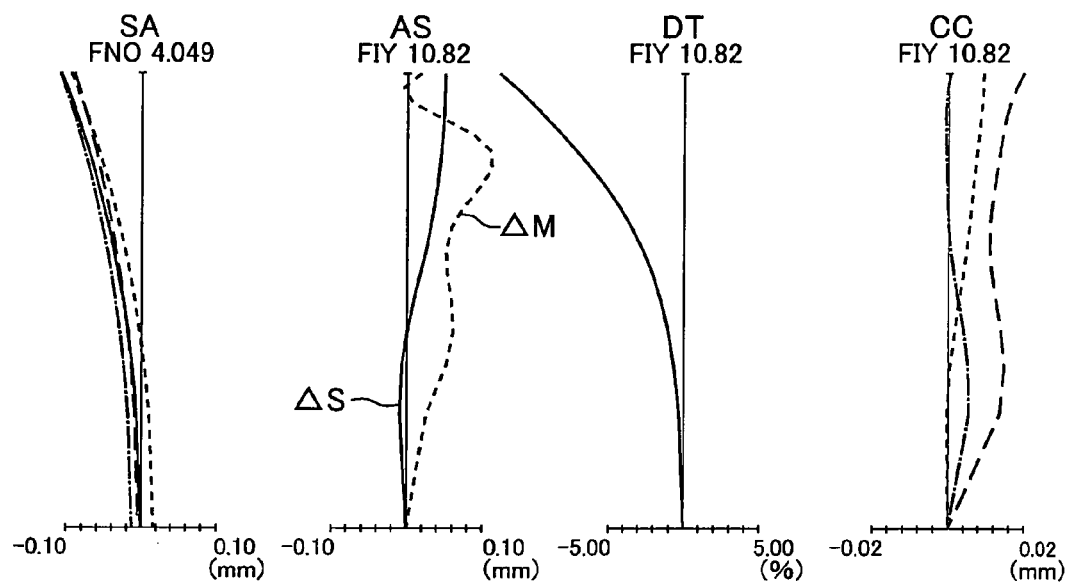
FIG. 15A and FIG. 15B are aberration diagrams at the time of close distance focusing, of the fifth embodiment.
Figure 15B:
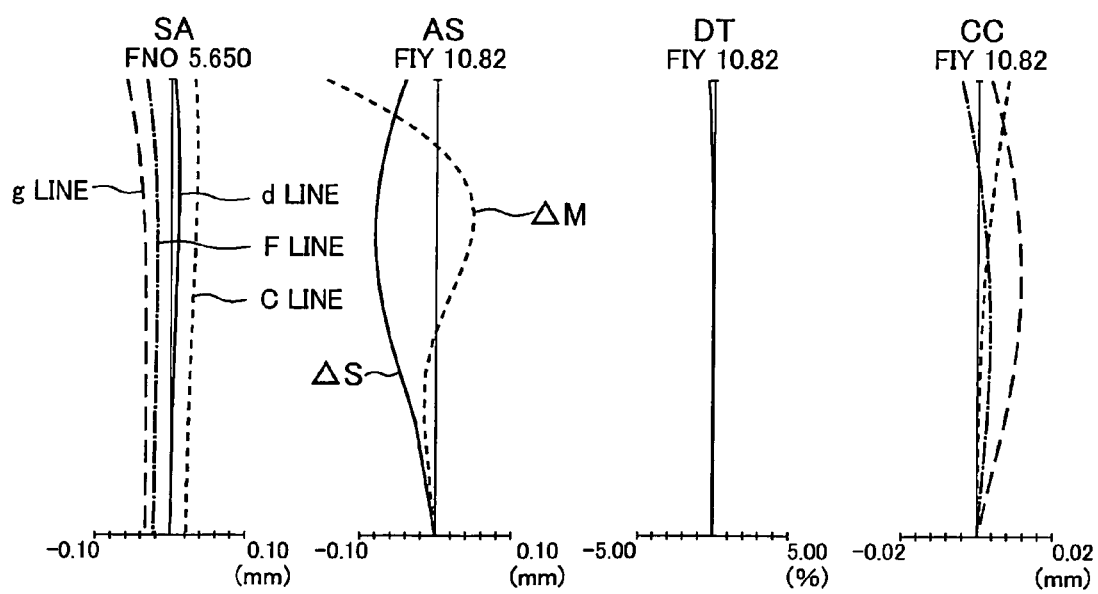

A zoom lens system in the fourth embodiment, as shown in FIG. 4A and FIG. 4B, includes in order from an object side, a first lens unit G1 having a negative refracting power and a second lens unit G2 having a positive refracting power.

An aperture stop S is disposed between a lens component nearest to the object side (object-side sub lens unit SG2a) in the second lens unit G1 and a second lens component from the object side in the second lens unit G2. Lens components from the second lens component on the object side up to a lens component on the image side form an image-side sub lens unit SG2b.

Movement at the time of zooming from the wide angle end to the telephoto end will be described below.

The first lens unit G1 moves toward the image side from the wide angle end up to an intermediate state in zooming, and moves toward the object side from that state up to the telephoto end. At the telephoto end, the first lens unit G1 is positioned toward the image side of a position at the wide angle end.

The second lens unit G2 and the aperture stop S move integrally toward the object side while narrowing a distance from the first lens unit G1, from the wide angle end to the telephoto end.

In order from the object side, the first lens unit G1 includes a negative meniscus lens having a convex surface directed toward the object side and a concave surface directed toward the image side, a biconcave negative lens, and a positive meniscus lens having a convex surface directed toward the object side. The second lens unit G2 includes a biconvex positive lens, a positive meniscus lens having a convex surface directed toward the object side, a cemented lens of a biconvex positive lens, a biconcave negative lens, and a biconvex positive lens, a cemented lens of a positive meniscus lens having a concave surface directed toward the object side and a biconcave negative lens, and a biconvex positive lens. The aperture stop S is disposed in a space between the first lens and the second lens of the second lens unit G2.

An aspheric surface is used for five surfaces namely, both surfaces of the negative meniscus lens and a surface on the image side of the biconcave negative lens in the first lens unit G1, and both surfaces of the biconvex positive lens nearest to the image side in the second lens unit G2.

Focusing from the infinite distance to the close distance is carried out by moving the biconvex positive lens nearest to the object side in the second lens unit G2, toward the image side.

A zoom lens system in the fifth embodiment, as shown in FIG. 5A and FIG. 5B, includes in order from an object side, a first lens unit G1 having a negative refracting power and a second lens unit G2 having a positive refracting power.

An aperture stop S is disposed between a lens component nearest to the object side (object-side sub lens unit SG2a) in the second lens unit G1 and a second lens component from the object side in the second lens unit G2. Lens components from the second lens component on the object side up to a lens component on the image side form an image-side sub lens unit SG2b.

Movement at the time of zooming from the wide angle end to the telephoto end will be described below.

The first lens unit G1 moves toward the image side from the wide angle end up to an intermediate state in zooming, and moves toward the object side form that state up to the telephoto end. At the telephoto end, the first lens unit G1 is positioned toward the image side than a position at the wide angle end.

The second lens unit G2 and the aperture stop S move integrally toward the object side while narrowing a distance from the first lens unit G1, from the wide angle end to the telephoto end.

In order from the object side, the first lens unit G1 includes a negative meniscus lens having a convex surface directed toward the object side and a concave surface directed toward the image side, a biconcave negative lens, and a positive meniscus lens having a convex surface directed toward the object side. The second lens unit G2 includes a biconvex positive lens, a cemented lens of a positive meniscus lens having a convex surface directed toward the object side and a positive meniscus lens having a convex surface directed toward the object side, a cemented lens of a biconvex positive lens, a biconcave negative lens, and a biconvex positive lens, a cemented lens of a positive meniscus lens having a concave surface directed toward the object side and a biconcave negative lens, and a biconvex positive lens. The aperture stop S is disposed in a space between the first lens and the second lens of the second lens unit G2.

An aspheric surface is used for six surfaces namely both surfaces of the negative meniscus lens and both surfaces of the biconcave negative lens in the first lens unit G1, and both surfaces of the biconvex positive lens nearest to the image side in the second lens unit G2.

Focusing from the infinite distance to the close distance is carried out by moving the biconvex positive lens nearest to the object side in the second lens unit G2, toward the image side.

Numerical data of each embodiment described above is shown below. Each of r1, r2, . . . denotes radius of curvature of each lens surface, each of d1, d2, . . . denotes a distance between two lenses or lens thickness, each of nd1, nd2, . . . denotes a refractive index of each lens for a d-line, and each of vd, vd2, . . . denotes an Abbe constant for each lens. f denotes a focal length of the entire zoom lens system, $F_{NO}$ denotes an F number, ω denotes a half angle of field, WE denotes a wide angle end, ST denotes an intermediate state, TE denotes a telephoto end, Further, * denotes an aspheric data.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When Z is let to be an optical axis with a direction of traveling of light as a positive (direction), and y is let to be in a direction orthogonal to the optical axis, a shape of the aspheric surface is described by the following expression.

$$Z=(y^2/r)/[1+\{1-(K+1)(y/r)^2\}^{1/2}]+A4y^4+A6y^6+A8y^8+A10y^{10}+A12y^{12}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'E-n' (where, n is an integral number) indicates '$10^{-n}$'.

Numerical Example 1

| Unit: mm | | | | |
|---|---|---|---|---|
| Surface data | | | | |
| Surface no. | r | d | nd | vd |
| Object plane | ∞ | ∞ | | |
| 1* | 285.432 | 2.500 | 1.8061 | 40.92 |
| 2* | 9.344 | 6.995 | | |
| 3 | −30.289 | 1.900 | 1.5831 | 59.38 |
| 4* | 146.911 | 1.000 | | |
| 5 | 21.720 | 3.405 | 1.8052 | 25.42 |
| 6 | 198.439 | Variable | | |
| 7 | 223.185 | 1.940 | 1.5500 | 50.00 |
| 8 | −40.508 | Variable | | |
| 9 (Stop) | ∞ | 1.000 | | |
| 10 | 15.538 | 2.186 | 1.7787 | 41.84 |
| 11 | 1391.478 | 0.200 | | |
| 12 | 149.497 | 4.062 | 1.4875 | 70.23 |
| 13 | −29.117 | 0.900 | 1.9037 | 31.32 |
| 14 | 14.259 | 5.564 | 1.4970 | 81.54 |
| 15 | −21.672 | 0.200 | | |
| 16 | −69.876 | 3.536 | 1.6129 | 37.00 |
| 17 | −10.084 | 1.100 | 1.8830 | 40.76 |
| 18 | 25.640 | 0.364 | | |
| 19* | 21.011 | 5.200 | 1.5825 | 59.32 |
| 20* | −14.814 | Variable | | |
| Image plane (Light receiving surface) | ∞ | | | |

Aspherical surface data

1st surface

K = 328.22
A4 = 3.896E−05, A6 = −2.457E−07, A8 = 8.354E−10,
A10 = −1.221E−12

2nd surface

K = −0.690
A4 = −3.169E−05, A6 = 1.950E−07, A8 = −1.062E−08,
A10 = 7.114E−11, A12 = −3.377E−13

4th surface

K = 0.000
A4 = 8.043E−05, A6 = 3.713E−07, A8 = −4.692E−10,
A10 = 2.478E−11

19th surface

K = 0.000
A4 = −8.389E−05, A6 = 4.703E−07, A8 = −3.630E−09,
A10 = 1.783E−11

20th surface

K = −0.863
A4 = −1.149E−05, A6 = −1.448E−07, A8 = 3.639E−09,
A10 = −2.567E−11

Zoom data

| | Wide angle | Telephoto |
|---|---|---|
| Focal length | 10.20 | 19.60 |
| F number | 4.08 | 5.77 |
| Angle of field(2ω) | 99.9° | 58.5° |
| Image height(IH) | 10.82 | 10.82 |
| Focus at infinity distance | | |
| Object to first surface | ∞ | ∞ |
| d6 | 20.494 | 1.500 |
| d8 | 3.764 | 3.764 |
| d20 | 21.136 | 34.866 |
| BF | 21.136 | 34.866 |
| Lens total length | 87.45 | 82.18 |
| Focus at most nearest distance | | |
| Object to first surface | 161.195 | 166.429 |
| d6 | 22.088 | 3.386 |
| d8 | 2.169 | 1.877 |
| d20 | 21.136 | 34.866 |

Zoom lens unit data(focus at infinity distance)

| Unit | Initial Surface | Focal length |
|---|---|---|
| 1 | 1 | −16.63 |
| 2 | 7 | 24.29 |

Numerical Example 2

Unit: mm

Surface data

| Surface no. | r | d | nd | vd |
|---|---|---|---|---|
| Object plane | ∞ | ∞ | | |
| 1* | 259.881 | 2.862 | 1.8061 | 40.92 |
| 2* | 12.090 | 6.660 | | |
| 3 | −129.165 | 1.514 | 1.7200 | 46.02 |
| 4 | 16.241 | 3.975 | | |
| 5 | 26.845 | 4.244 | 1.7552 | 27.51 |
| 6 | −84.436 | Variable | | |
| 7 | 200.319 | 1.488 | 1.7200 | 43.69 |
| 8 | −52.917 | Variable | | |
| 9 (Stop) | ∞ | 1.019 | | |
| 10 | 11.325 | 1.699 | 1.7170 | 47.92 |
| 11 | 16.811 | 2.012 | | |
| 12 | 15.960 | 3.119 | 1.4970 | 81.54 |
| 13 | −24.642 | 0.215 | | |
| 14 | −27.181 | 2.085 | 1.8830 | 40.76 |
| 15 | 8.486 | 4.355 | 1.4875 | 70.23 |
| 16 | 485.707 | 0.200 | | |
| 17 | 16.881 | 7.652 | 1.4875 | 70.23 |
| 18 | −10.733 | 1.000 | 1.8061 | 40.92 |
| 19 | 289.247 | 2.011 | | |
| 20* | 35.050 | 5.388 | 1.7432 | 49.34 |
| 21* | −42.199 | Variable | | |
| Image plane (Light receiving surface) | ∞ | | | |

Aspherical surface data

1st surface

K = 224.787
A4 = 5.577E−05, A6 = −2.794E−07, A8 = 6.255E−10,
A10 = −6.712E−13
2nd surface K = −0.319
A4 = 1.256E−05, A6 = 2.775E−07, A8 = −5.365E−09,
A10 = −1.023E−11, A12 = 8.892E−14
20th surface K = 1.671
A4 = −9.687E−06, A6 = 6.555E−07, A8 = −5.731E−10,
A10 = 4.395E−12
21st surface

K = −4.8048
A4 = 4.627E−05, A6 = 3.683E−07, A8 = 3.160E−09,
A10 = 3.753E−12

Zoom data

| | Wide angle | Telephoto |
|---|---|---|
| Focal length | 9.18 | 17.64 |
| F number | 4.08 | 5.77 |
| Angle of field(2ω) | 105.9° | 64.1° |
| Image height(IH) | 10.82 | 10.82 |
| Focus at infinity distance | | |
| Object to first surface | ∞ | ∞ |
| d6 | 23.825 | 1.526 |
| d8 | 3.145 | 3.145 |
| d21 | 14.981 | 28.099 |
| BF | 14.981 | 28.099 |
| Lens total length | 93.49 | 84.19 |
| Focus at most nearest distance | | |
| Object to first surface | 155.108 | 164.047 |
| d6 | 25.581 | 3.176 |
| d8 | 1.383 | 1.500 |
| d21 | 14.981 | 28.099 |

Zoom lens unit data(focus at infinity distance)

| Unit | Initial Surface | Focal length |
|---|---|---|
| 1 | 1 | −16.67 |
| 2 | 7 | 25.61 |

Numerical Example 3

Unit: mm

Surface data

| Surface no. | r | d | nd | vd |
|---|---|---|---|---|
| Object plane | ∞ | ∞ | | |
| 1* | 270.000 | 2.500 | 1.8061 | 40.92 |
| 2* | 9.581 | 7.868 | | |
| 3* | −29.530 | 1.900 | 1.5831 | 59.38 |
| 4* | 131.709 | 1.679 | | |
| 5 | 23.237 | 3.550 | 1.8052 | 25.42 |
| 6 | 199.460 | Variable | | |
| 7 | 91.294 | 1.940 | 1.5508 | 50.02 |
| 8 | −54.840 | Variable | | |
| 9 (Stop) | ∞ | 1.000 | | |
| 10 | 16.352 | 3.235 | 1.6983 | 45.38 |
| 11 | −502.856 | 0.200 | | |
| 12 | 95.470 | 5.375 | 1.4875 | 70.23 |
| 13 | −22.204 | 0.900 | 1.9037 | 31.32 |
| 14 | 14.744 | 5.608 | 1.4970 | 81.54 |
| 15 | −25.369 | 0.200 | | |
| 16 | 882.016 | 3.758 | 1.6129 | 37.00 |
| 17 | −11.915 | 1.100 | 1.8830 | 40.76 |
| 18 | 29.134 | 0.350 | | |
| 19* | 21.255 | 5.200 | 1.5825 | 59.32 |
| 20* | −17.042 | Variable | | |
| Image plane (Light receiving surface) | ∞ | | | |

Aspherical surface data

1st surface

K = 207.60
A4 = 2.493E−05, A6 = −1.316E−07, A8 = 4.345E−10,
A10 = −5.985E−13
2nd surface K = −0.859
A4 = −4.460E−05, A6 = 1.766E−07, A8 = −5.948E−09,
A10 = 3.483E−11, A12 = −7.197E−14
3rd surface K = −0.1445
A4 = −3.773E−06, A6 = 1.829E−07, A8 = 2.361E−10,
A10 = −1.848E−12
4th surface K = 0.000
A4 = 8.459E−05, A6 = 4.913E−07, A8 = 6.382E−10,
A10 = −3.051E−12
19 surface

K = 0.000
A4 = −5.724E−05, A6 = 3.097E−07, A8 = −1.306E−09,
A10 = 1.094E−11

-continued

Unit: mm

20th surface

K = −1.277
A4 = 4.148E−06, A6 = 4.384E−08, A8 = 2.274E−09,
A10 = 2.946E−12

Zoom data

|  | Wide angle | Telephoto |
|---|---|---|
| Focal length | 9.18 | 17.64 |
| F number | 4.08 | 5.77 |
| Angle of field(2ω) | 105.7° | 63.5° |
| Image height(IH) | 10.82 | 10.82 |
| Focus at infinity distance |  |  |
| Object to first surface | ∞ | ∞ |
| d6 | 22.709 | 1.500 |
| d8 | 3.883 | 3.883 |
| d20 | 18.279 | 31.037 |
| BF | 18.279 | 31.037 |
| Lens total length | 91.23 | 82.78 |
| Focus at most nearest distance |  |  |
| Object to first surface | 157.295 | 165.800 |
| d6 | 24.277 | 3.297 |
| d8 | 2.316 | 2.087 |
| d20 | 18.279 | 31.037 |

Zoom lens unit data(focus at infinity distance)

| Unit | Initial Surface | Focal length |
|---|---|---|
| 1 | 1 | −16.41 |
| 2 | 7 | 24.74 |

Numerical Example 4

Unit: mm

Surface data

| Surface no. | r | d | nd | νd |
|---|---|---|---|---|
| Object plane | ∞ | ∞ |  |  |
| 1* | 338.104 | 2.500 | 1.8061 | 40.92 |
| 2* | 9.461 | 6.184 |  |  |
| 3 | −28.653 | 1.900 | 1.5831 | 59.38 |
| 4* | 189.462 | 1.000 |  |  |
| 5 | 21.356 | 3.192 | 1.8052 | 25.42 |
| 6 | 198.383 | Variable |  |  |
| 7 | 379.117 | 1.940 | 1.5532 | 52.41 |
| 8 | −37.974 | Variable |  |  |
| 9 (Stop) | ∞ | 1.000 |  |  |
| 10 | 15.170 | 2.291 | 1.7863 | 41.57 |
| 11 | 378.434 | 0.200 |  |  |
| 12 | 147.910 | 3.435 | 1.4875 | 70.23 |
| 13 | −32.720 | 0.900 | 1.9037 | 31.32 |
| 14 | 14.723 | 5.985 | 1.4970 | 81.54 |
| 15 | −23.347 | 0.200 |  |  |
| 16 | −204.418 | 3.726 | 1.6129 | 37.00 |
| 17 | −9.998 | 1.100 | 1.8830 | 40.76 |
| 18 | 20.819 | 0.486 |  |  |
| 19* | 19.506 | 5.200 | 1.5825 | 59.32 |
| 20* | −15.903 | Variable |  |  |
| Image plane (Light receiving surface) | ∞ |  |  |  |

-continued

Unit: mm

Aspherical surface data

1st surface

K = 563.78
A4 = 5.709E−05, A6 = −3.634E−07, A8 = 1.208E−09,
A10 = −1.767E−12

2nd surface

K = −0.435
A4 = −4.103E−05, A6 = 7.551E−08, A8 = −1.168E−08,
A10 = 3.840E−11, A12 = −3.730E−13

4th surface

K = 0.000
A4 = 8.548E−05, A6 = 3.413E−07, A8 = −1.992E−10,
A10 = 4.110E−11

19th surface

K = 0.000
A4 = −7.166E−05, A6= 3.633E−07, A8 = −2.984E−09,
A10 = 2.245E−11

20th surface

K = −0.779
A4 = −1.003E−05, A6 = −1.344E−07, A8 = 2.677E−09,
A10 = −1.595E−11

Zoom data

|  | Wide angle | Telephoto |
|---|---|---|
| Focal length | 11.22 | 21.56 |
| F number | 4.08 | 5.77 |
| Angle of field(2ω) | 93.4° | 53.9° |
| Image height(IH) | 10.82 | 10.82 |
| Focus at infinity distance |  |  |
| Object to first surface | ∞ | ∞ |
| d6 | 19.666 | 2.232 |
| d8 | 3.350 | 3.350 |
| d20 | 22.091 | 36.962 |
| BF | 22.091 | 36.962 |
| Lens total length | 86.35 | 83.78 |
| Focus at most nearest distance |  |  |
| Object to first surface | 162.227 | 164.800 |
| d6 | 21.304 | 4.185 |
| d8 | 1.713 | 1.396 |
| d20 | 22.091 | 36.962 |

Zoom lens unit data(focus at infinity distance)

| Unit | Initial Surface | Focal length |
|---|---|---|
| 1 | 1 | −16.84 |
| 2 | 7 | 24.22 |

Numerical Example 5

Unit: mm

Surface data

| Surface no. | r | d | nd | νd |
|---|---|---|---|---|
| Object plane | ∞ | ∞ |  |  |
| 1* | 269.996 | 2.500 | 1.8061 | 40.92 |
| 2* | 9.731 | 8.809 |  |  |
| 3* | −30.470 | 1.900 | 1.5831 | 59.38 |
| 4* | 62.995 | 2.657 |  |  |
| 5 | 24.490 | 3.807 | 1.8052 | 25.42 |
| 6 | 226.586 | Variable |  |  |
| 7 | 55.084 | 1.940 | 1.5629 | 50.41 |
| 8 | −96.146 | Variable |  |  |

-continued

Unit: mm

| | | | | |
|---|---|---|---|---|
| 9 (Stop) | ∞ | 1.000 | | |
| 10 | 18.267 | 2.365 | 1.6580 | 47.78 |
| 11 | 18.806 | 2.281 | 1.6386 | 33.83 |
| 12 | 349.721 | 1.551 | | |
| 13 | 21.858 | 2.397 | 1.4875 | 70.23 |
| 14 | −35.685 | 0.900 | 1.9037 | 31.32 |
| 15 | 12.087 | 7.638 | 1.4970 | 81.54 |
| 16 | −16.936 | 0.200 | | |
| 17 | −32.946 | 2.921 | 1.6129 | 37.00 |
| 18 | −11.868 | 1.000 | 1.8830 | 40.76 |
| 19 | 54.435 | 0.350 | | |
| 20* | 22.777 | 5.755 | 1.5825 | 59.32 |
| 21* | −21.280 | Variable | | |
| Image plane (Light receiving surface) | ∞ | | | |

Aspherical surface data

1st surface

K = 187.82
A4 = 1.683E−05, A6 = −1.173E−07, A8 = 4.407E−10,
A10 = −5.779E−13

2nd surface

K = −0.988
A4 = −6.429E−05, A6 = 6.826E−08, A8 = −4.804E−09,
A10 = 4.020E−11, A12 = −7.592E−14

3rd surface

K = −0.6094
A4 = 4.891E−06, A6 = 1.699E−07, A8 = −2.416E−10,
A10 = 5.664E−13

4th surface

K = 0.000
A4 = 1.132E−04, A6 = 4.594E−07, A8 = −3.550E−10,
A10 = −8.878E−12

20th surface

K = 0.000
A4 = −1.530E−05, A6 = 7.722E−07, A8 = 2.270E−10,
A10 = 1.883E−11

21st surface

K = −3.326
A4 = 2.344E−05, A6 = 8.464E−07, A8 = −2.149E−09,
A10 = 9.076E−11

Zoom data

| | Wide angle | Telephoto |
|---|---|---|
| Focal length | 8.16 | 15.68 |
| F number | 4.08 | 5.77 |
| Angle of field(2ω) | 111.9° | 69.2° |
| Image height(IH) | 10.82 | 10.82 |
| Focus at infinity distance | | |
| Object to first surface | ∞ | ∞ |
| d6 | 24.031 | 1.500 |
| d8 | 3.921 | 3.921 |
| d21 | 17.323 | 29.738 |
| BF | 17.323 | 29.738 |
| Lens total length | 95.24 | 85.13 |
| Focus at most nearest distance | | |
| Object to first surface | 153.388 | 163.479 |
| d6 | 25.416 | 3.062 |
| d8 | 2.536 | 2.358 |
| d21 | 17.323 | 29.738 |

Zoom lens unit data(focus at infinity distance)

| Unit | Initial | Surface Focal length |
|---|---|---|
| 1 | 1 | −15.24 |
| 2 | 7 | 25.16 |

Aberration diagrams at the time of infinite distance focusing of the embodiments from the first embodiment to the fifth embodiment are shown in FIG. 6A, FIG. 6B, FIG. 8A, FIG. 8B, FIG. 10A, FIG. 10B, FIG. 12A, FIG. 12B, FIG. 14A, and FIG. 14B. Aberration diagrams at the time of close distance focusing of the embodiments from the first embodiment to the fifth embodiment are shown in FIG. 7A, FIG. 7B, FIG. 9A, FIG. 9B, FIG. 11A, FIG. 11B, FIG. 13A, FIG. 13B, FIG. 15A, and FIG. 15B. In these aberration diagrams, a spherical aberration SA, an astigmatism AS, a distortion DT, and a chromatic aberration of magnification CC at (a) the wide angle end and (b) the telephoto end are shown. In the aberration diagrams, FIY denotes an image height.

Further, values of conditional expressions (1)-(A) in each of the above-mentioned examples are shown below.

| | Example 1 | Example 2 | Example 3 | Example 4 | Example 5 |
|---|---|---|---|---|---|
| (1) | 1.537 | 1.541 | 1.517 | 1.557 | 1.408 |
| (2) | 2.246 | 2.368 | 2.287 | 2.239 | 2.326 |
| (3) | 5.778 | 5.388 | 5.778 | 5.778 | 5.778 |
| (4) | 0.724 | 0.949 | 0.754 | 0.719 | 0.825 |
| (5) | 0.944 | 0.808 | 0.871 | 0.937 | 0.841 |
| (6) | −1.068 | −1.098 | −1.074 | −1.058 | −1.075 |
| (A) | 99.9° | 105.9° | 105.7° | 93.4° | 111.9° |

In each of the embodiments from the first embodiment to the fifth embodiment, the arrangement may be let to be as follows.

In the zoom lenses according to the embodiments, barrel distortion occurs on the rectangular photoelectric conversion surface, at the wide angle end. Whereas, at the telephoto end and near the intermediate focal length state, distortion is suppressed.

To correct distortion electrically, the effective image pickup area is designed to have a barrel shape at the wide angle end and a rectangular shape near the intermediate focal length position and at the telephoto end. In addition, the effective image pickup area, which has been set in advance, is transformed into rectangular image information with reduced distortion by image transformation using image processing.

The maximum image height $IH_w$ at the wide angle end is designed to be smaller than the maximum image height $IH_s$ at the intermediate focal length state and the maximum image height $IH_t$ at the telephoto end.

By making such an arrangement, since an effective diameter of the first lens unit becomes all the more small, it is advantageous for making the diameter small.

Moreover, it is preferable to have an image converting section which converts an electric signal of an image which is picked up by the zoom lens system, to an image signal in which, a color shift due to the chromatic aberration of magnification is corrected by image processing. By correcting the chromatic aberration of magnification of the zoom lens system electrically, it is possible to achieve a favorable image.

The chromatic aberration of magnification changes according to a zooming state, a focusing state, and an aperture value, and for each lens position (zooming state, focusing state, and aperture value) an amount of shift from a first primary color to a second primary color and a third primary color may be stored as correction data in a memory holding unit. By referring to the correction data according to the zooming position, it is possible to output a second primary color signal and a third primary color signal in which the shift in the second primary color and the third primary color is corrected, with respect to a first primary color signal.

Moreover, for cutting unnecessary light such as ghost and flare, a flare aperture may be disposed arbitrarily apart from the aperture stop.

The flare aperture, may be disposed at any of locations namely, on the object side of the first lens unit, between the first lens unit and the second lens unit, and between a unit nearest to an image surface and the image surface.

An arrangement may be made such that flare light rays are cut by a frame member, or some other member may be arranged. It may be printed or painted directly on an optical system, or a seal may be stuck directly. Moreover, a shape thereof may be any shape such as a circular shape, an elliptical shape, a rectangular shape, a polygonal shape, and a range surrounded by a function curve. Not only unnecessary light beam but also a light beam such as coma flare around a screen may be cut.

Moreover, the ghost and the flare may be reduced by applying an antireflection coating on a surface in contact with air or a joint surface of the lenses. Multi-coating is desirable as it enables to reduce the ghost and the flare effectively. It is possible to carry out a reduction of further reflectivity and a control of angular characteristics and spectral characteristics of reflectivity by combining two or more layers of a film of a coating material or a film thickness. Moreover, infrared-cutting coating may be applied to lens surfaces and the cover glass.

FIG. 16 is a cross-sectional view of a single-lens reflex camera of an interchangeable lens type in which, the two-unit zoom lens system of the present invention is used, and a small-size CCD or C-MOS sensor is used as the image pickup element. In FIG. 16, reference numeral 1 denotes a single-lens reflex camera, reference numeral 2 denotes a photographic lens system according to the present invention, which is disposed inside a lens barrel having a zooming mechanism and a focusing mechanism, reference numeral 3 denotes a mounting portion of the lens barrel which enables to attach and detach the photographic lens system 2 to and from the single-lens reflex camera 1, and a mounting of a screw-type or a bayonate type is used for the mounting portion. In this example, amounting of the bayonate type is used. Moreover, reference numeral 4 denotes an image pickup element surface (an image pickup surface), reference numeral 5 denotes a quick-return mirror which is disposed between a lens system in an optical path 6 of the photographic lens system 2 and the image pickup element surface 4, reference numeral 7 denotes a finder screen which is disposed in an optical path reflected by the quick-return mirror 5, reference numeral 8 denotes a pentaprism, reference numeral 9 denotes a finder, and E denotes an eye (eye point) of an observer. A filter such as a dust filter which shakes off dust by vibrations, an infrared cutting filter, and a low pass filter, and a cover glass which protects the image pickup surface are disposed between the quick-return mirror 5 and the image pickup element surface 4.

As the photographic lens system 2 of the single-lens reflex camera 1 having such arrangement, the two-unit zoom lens system of the present invention described in the first embodiment is used.

Moreover, the present invention can also be let to be an interchangeable lens of a digital interchangeable-lens camera which does not have a quick-return mirror. The present invention is also applicable to a monitoring camera in which, a wide angle of field is necessary, and a so-called compact digital camera which is not of the interchangeable-lens type.

According to the present invention, it is possible to provide a two-unit zoom lens system which is advantageous for securing an angle of field while it is easy to suppress an increase in a size in a radial direction.

Furthermore, it is possible to provide an image pickup apparatus which includes such two-unit zoom lens system.

What is claimed is:

1. A two-unit zoom lens system which forms an image on an image pickup surface, comprising in order from an object side to an image side:
    a first lens unit having a negative refracting power; and
    a second lens unit having a positive refracting power, wherein
    at the time of zooming from a wide angle end to a telephoto end,
    a distance between the first lens unit and a second lens unit is narrowed, and
    the first lens unit comprises in order from the object side to the image side, a first lens element having a negative refracting power, a second lens element having a negative refracting power, and a third lens element having a positive refracting power, and
    the total number of lens elements in the first lens unit is three, and
    the two-unit zoom lens system satisfies the following conditional expressions (1) and (2-2)

$$1.28<|f1|/IH<1.72 \quad (1)$$

$$2.1<f2/IH \quad (2\text{-}2)$$

where,
f1 denotes a focal length of the first lens unit,
f2 denotes a focal length of the second lens unit, and
IH denotes the maximum image height in an effective image pickup area on the image pickup surface.

2. The two-unit zoom lens system according to claim 1, wherein the two-unit zoom lens system satisfies the following conditional expression (2-3)

$$2.1<f2/IH<2.5 \quad (2\text{-}3).$$

3. The two-unit zoom lens system according claim 1, wherein
    the first lens element in the first lens unit is a negative meniscus lens element which is concave on the image side, and has an aspheric surface on the image side and an aspheric surface on the object side, and
    the surface on the object side of the first lens element has a positive refracting power which is higher at a circumferential portion than at a center, and
    the surface on the image side of the first lens element has a negative refracting power which is lower at a circumferential portion than at a center.

4. The two-unit zoom lens system according to claim 1, wherein
    the first lens element in the first lens unit is a negative meniscus lens element which is concave on the image side, and the second lens element is a biconcave negative lens element, and the third lens element is a positive lens element which is convex on the object side.

5. The two-unit zoom lens system according to claim 1, wherein the second lens unit comprises an aspherical positive lens element which is convex on the image side, disposed nearest to the image side in the second lens unit.

6. The two-unit zoom lens system according to claim 1, wherein the two-unit zoom lens system satisfies the following conditional expression (4)

$$0.7 < fl\_L01/f1 < 1.0 \tag{4}$$

where, f1 denotes a focal length of the first lens unit, and fl_L01 denotes a focal length of the first lens element in the first lens unit.

7. The two-unit zoom lens system according to claim 1, wherein the two-unit zoom lens system satisfies the following conditional expression (5)

$$0.7 < f2/\Sigma 2G < 1.0 \tag{5}$$

where, f2 denotes a focal length of the second lens unit, and

Σ2G denotes an optical axial thickness of the second lens unit at the time of infinite distance focusing.

8. The two-unit zoom lens system according to claim 1, wherein a lens component denotes a lens block having an object-side surface which is contacted with an air space and an image-side surface which is contacted with the air space in an optical path of the two-unit zoom lens system and the lens block has no air space between the object-side surface and the image-side surface, the second lens unit comprises in order from the object side to the image side a first lens component having a positive refracting power, a second lens component having a positive refracting power, a third lens component, a fourth lens component having a negative refracting power, and a fifth lens component having a positive refracting power, and the total number of lens components in the second lens unit is five, and an aperture stop is disposed between the first lens component and the second lens component.

9. The two-unit zoom lens system according to claim 8, wherein the third lens unit component is a cemented lens component comprising in order from the object side to the image side, a positive lens element, a negative lens element, and a positive lens element.

10. The two-unit zoom lens system according to claim 8, wherein the fourth lens component is a cemented lens component which includes a plurality of lens elements.

11. The two-unit zoom lens system according to claim 8, wherein the fifth lens component is a single lens element.

12. The two-unit zoom lens system according to claim 1, wherein the first lens element in the first lens unit is a meniscus lens which satisfies the following conditional expression (6)

$$-1.15 < (R\_im + R\_ob)/(R\_im - R\_ob) < -1 \tag{6}$$

where,

R_ob is a paraxial radius of curvature of a surface on the object side of the first lens, and R_im is a paraxial radius of curvature of a surface on the image side of the first lens.

13. The two-unit zoom lens system according to claim 1, wherein at the time of zooming from the wide angle end to the telephoto end, the first lens unit, first moves toward the image side, and thereafter moves toward the object side, and the second lens unit moves toward the object side.

14. An image pickup apparatus comprising:

a two-unit zoom lens system according to claim 1, and an image pickup element which has the image pickup surface which is disposed on an image side of the two-unit zoom lens system.

15. A two-unit zoom lens system which forms an image on an image pickup surface, comprising in order from an object side to an image side:

a first lens unit having a negative refracting power; and a second lens unit having a positive refracting power, wherein at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, and a third lens element having a positive refracting power, and the total number of lens elements in the first lens unit is three, and the second lens unit includes an aspherical lens element which is disposed nearest to the image side in the second lens unit, and the two-unit zoom lens system satisfies the following conditional expression (1)

$$1.28 < |f1|/IH < 1.72 \tag{1}$$

where, f1 denotes a focal length of the first lens unit, and

IH denotes the maximum image height in an effective image pickup area of the image pickup surface.

16. A two-unit zoom lens system which forms an image on an image pickup surface, comprising in order from an object side to an image side:

a first lens unit having a negative refracting power; and a second lens unit having a positive refracting power, wherein at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, a third lens element having a positive refracting power, and the total number of lens elements in the first lens unit is three, and the second lens unit comprises in order from the object side to the image side, an object-side sub lens unit and an image-side sub lens unit, and an aperture stop is disposed between the object-side sub lens unit and the image-side sub lens unit, and the aperture stop and the second lens unit move toward the object side at the time of zooming from the wide angle end to the telephoto end, and the two-unit zoom lens system satisfies the following conditional expressions (1) and (3)

$$1.28<|f1|/IH<1.72 \quad (1)$$

$$4.0<fl\_g2a/IH \quad (3)$$

where, f1 denotes a focal length of the first lens unit, fl_g2a denotes a focal length of the object-side sub lens unit in the second lens unit, and IH denotes the maximum image height in an effective image pickup area of the image pickup surface.

17. The two-unit zoom lens system according to claim 16, wherein the two-unit zoom lens system satisfies the following conditional expression (3-1)

$$4.0<fl\_g2a/IH<7.0 \quad (3-1).$$

18. The two-unit zoom lens system according to claim 16, wherein at the time of focusing from an infinite distance focusing to a close distance focusing, the object-side sub lens unit in the second lens unit moves independently of the first lens unit and the image-side sub lens unit.

19. The two-unit zoom lens system according to claim 16, wherein the object-side sub lens unit in the second lens unit consists of a single lens having a positive refracting power.

20. A two-unit zoom lens system which forms an image on an image pickup surface, comprising in order from an object side to an image side:

a first lens unit having a negative refracting power; and a second lens unit having a positive refracting power, wherein at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, and a third lens element having a positive refracting power, and the total number of lens elements in the first lens unit is three, and the two-unit zoom lens system satisfies the following conditional expressions (2-4) and (A)

$$2.1<f2/IH<2.45 \quad (2-4)$$

$$2\omega>85° \quad (A)$$

where, f2 denotes a focal length of the second lens unit,

IH denotes the maximum image height in an effective image pickup area on the image pickup surface, and ω denotes the maximum photographic half angle of field, at the wide angle end.

21. A two-unit zoom lens system which forms an image on an image pickup surface, comprising in order from an object side to an image side:

a first lens unit having a negative refracting power; and a second lens unit having a positive refracting power, wherein at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, and a third lens element having a positive refracting power, and the total number of lens elements in the first lens unit is three, and each of the first lens element, the second lens element, and the third lens element is a single lens element, and the two-unit zoom lens system satisfies the following conditional expressions (2-5) and (A)

$$1.83<f2/IH<2.45 \quad (2-5)$$

$$2\omega>85° \quad (A)$$

where, f2 denotes a focal length of the second lens unit,

IH denotes the maximum image height in an effective image pickup area on the image pickup surface, and ω denotes the maximum photographic half angle of field, at the wide angle end.

22. A two-unit zoom lens system which forms an image on an image pickup surface, comprising in order from an object side to an image side:

a first lens unit having a negative refracting power; and a second lens unit having a positive refracting power, wherein at the time of zooming from a wide angle end to a telephoto end, a distance between the first lens unit and the second lens unit is narrowed, and the first lens unit comprises in order from the object side to the image side, a first lens element having a negative refracting power, a second lens element having a negative refracting power, and a third lens element having a positive refracting power, and the total number of lens elements in the first lens unit is three, and the second lens unit comprises in order from the object side to the image side, an object-side sub lens unit and an image-side sub lens unit, and an aperture stop is disposed between the object-side sub lens unit and the image-side sub lens unit, and the aperture stop and the second lens unit move toward the object side at the time of zooming from the wide angle end to the telephoto end, and the two-unit zoom lens system satisfies the following conditional expressions (3-2), and (A)

$$5.0<fl\_g2a/IH \quad (3-2)$$

$$2\omega>85° \quad (A)$$

where, fl_g2a denotes a focal length of the object-side sub lens unit in the second lens unit, IH denotes the maximum image height in an effective image pickup area on the image pickup surface, and ω denotes the maximum photographic half angle of field at the wide angle end.

23. The two-unit zoom lens system according to claim 22, wherein the two-unit zoom lens system satisfies the following conditional expression (3-3)

$$5.0 < fl\_g2a/IH < 7.0 \tag{3-2}.$$

24. A two-unit zoom lens system which forms an image on an image pickup surface, comprising in order from an object side to an image side:
  a first lens unit having a negative refracting power; and
  a second lens unit having a positive refracting power, wherein
  at the time of zooming from a wide angle end to a telephoto end,
  a distance between the first lens unit and the second lens unit is narrowed, and
  the first lens unit comprises in order from the object side to the image side, a first lens element having a negative refracting power, a second lens element having a negative refracting power, and a third lens element having a positive refracting power, and
  the total number of lens elements in the first lens unit is three, and
  each of the first lens element, the second lens element, and the third lens element is a single lens element, and
  the second lens unit comprises in order from the object side to the image side,
  an object-side sub lens unit and an image-side sub lens unit, and
  an aperture stop is disposed between the object-side sub lens unit and the image-side sub lens unit, and
  the aperture stop and the second lens unit move toward the object side at the time of zooming from the wide angle end to the telephoto end, and
  the two-unit zoom lens system satisfies the following conditional expressions (3) and (A)

$$4.0 < fl\_g2a/IH \tag{3}$$

$$2\omega > 85° \tag{A}$$

where,
  fl_g2a denotes a focal length of the object-side sub lens unit in the second lens unit,
  IH denotes the maximum image height in an effective image pickup area on the image pickup surface, and
  ω denotes the maximum photographic half angle of field, at the wide angle end.

25. The two-unit zoom lens system according to claim 24, wherein the two-unit zoom lens system satisfies the following conditional expression (3-1)

$$4.0 < fl\_g2a/IH < 7.0 \tag{3-1}.$$

* * * * *